United States Patent
Liu et al.

(10) Patent No.: US 11,014,097 B2
(45) Date of Patent: May 25, 2021

(54) FUNCTIONALIZED SILICONES FOR FROTH FLOTATION

(71) Applicant: ECOLAB USA INC., St. Paul, MN (US)

(72) Inventors: Jianjun Liu, Aurora, IL (US); Daniel Hay, Naperville, IL (US); Jaqueline Herrera, Naperville, IL (US); Kevin O'Brien, Saint Charles, IL (US); Eric Bauch, Corsicana, TX (US); Glenda Vale, Corsicana, TX (US)

(73) Assignee: Ecolab USA Inc., St. Paul, MN (US)

( * ) Notice: Subject to any disclaimer, the term of this patent is extended or adjusted under 35 U.S.C. 154(b) by 519 days.

(21) Appl. No.: 15/840,928

(22) Filed: Dec. 13, 2017

(65) Prior Publication Data

US 2018/0161783 A1 Jun. 14, 2018

Related U.S. Application Data

(60) Provisional application No. 62/434,264, filed on Dec. 14, 2016.

(51) Int. Cl.
  *B03D 1/016* (2006.01)
  *B03D 1/02* (2006.01)
  (Continued)

(52) U.S. Cl.
  CPC ............... *B03D 1/02* (2013.01); *B03D 1/016* (2013.01); *C08G 77/26* (2013.01); *C08L 83/04* (2013.01);
  (Continued)

(58) Field of Classification Search
  CPC .......... B03D 1/02; B03D 1/016; B03D 1/008; B03D 1/0046; B03D 2201/02;
  (Continued)

(56) References Cited

U.S. PATENT DOCUMENTS 2,583,322 A * 1/1952 Burkhard .............. C07F 7/0838
  556/427
2,934,208 A  4/1960 Schoeld et al.
  (Continued)

FOREIGN PATENT DOCUMENTS

CN  102259062 A  11/2011
CN  104289320 A  1/2015
  (Continued)

OTHER PUBLICATIONS

Bulatovic, SM, Ed, Handbook of Flotation Reagents, vol. 1, Elsevier, (2007) pp. 4-40.
(Continued)

*Primary Examiner* — Thomas M Lithgow
(74) *Attorney, Agent, or Firm* — Kagan Binder, PLLC

(57) ABSTRACT

Improved sparge compositions for froth flotation separation, methods of using them, and uses thereof are described. The compositions are suitably used in the froth flotation of particulate material containing ultrafine particles, and are well suited to the froth flotation separation of finely comminuted poor (low-grade) ores. The sparge compositions comprise functionalized silicone containing functionality that is tailored to the chemical nature of a beneficiary or a gangue in the ore. Sparging of the compositions effects improved recoveries and purities of beneficiaries. Sparge compositions and functionalized silicones suitable for the froth flotation of iron ores containing silica and/or silicate impurities are described. Sparge compositions and functionalized silicones suitable for the froth flotation of ores containing sulfur compounds such as sulfides are also disclosed.

13 Claims, 3 Drawing Sheets

(51) Int. Cl.
| | |
|---|---|
| *B03D 1/008* | (2006.01) |
| *C08G 77/26* | (2006.01) |
| *C08L 83/12* | (2006.01) |
| *C08L 83/04* | (2006.01) |
| *B03D 1/004* | (2006.01) |

(52) U.S. Cl.
CPC .............. *C08L 83/12* (2013.01); *B03D 1/008* (2013.01); *B03D 1/0046* (2013.01); *B03D 2201/02* (2013.01); *B03D 2201/04* (2013.01)

(58) Field of Classification Search
CPC ..... B03D 2201/04; C08G 77/26; C08L 83/12; C08L 83/03
USPC .................................... 209/164–170; 252/61
See application file for complete search history.

(56) References Cited

U.S. PATENT DOCUMENTS

| | | | |
|---|---|---|---|
| 2,957,576 A | 10/1960 | Henderson | |
| 3,072,256 A | 1/1963 | Gotte et al. | |
| 3,363,758 A | 1/1968 | Cronberg et al. | |
| 3,640,385 A | 2/1972 | Smith et al. | |
| 4,290,896 A | 9/1981 | Gordon et al. | |
| 4,290,897 A * | 9/1981 | Swihart .................. | B01D 37/03 210/710 |
| 4,319,987 A | 3/1982 | Shaw et al. | |
| 4,525,281 A | 6/1985 | Cooper | |
| 4,526,680 A | 7/1985 | Owen | |
| 4,532,032 A | 7/1985 | Ng et al. | |
| 5,653,945 A | 8/1997 | Gathje et al. | |
| 6,076,682 A | 6/2000 | Gustafsson et al. | |
| 6,200,377 B1 | 3/2001 | Basilio et al. | |
| 6,959,815 B2 | 11/2005 | Xu et al. | |
| 8,701,892 B2 | 4/2014 | Gustafsson et al. | |

FOREIGN PATENT DOCUMENTS

| | | |
|---|---|---|
| GB | 898213 A | 6/1962 |
| SE | 421177 B | 12/1981 |
| WO | 2008/077849 A1 | 7/2008 |

OTHER PUBLICATIONS

Araujo, A.C., (2005) "Reagents in Iron Ores Flotation," Minerals Engineering 18, pp. 219-224.
Cassola, M.S. et al. (2011) "Investigation on Collector Optimisation in the Reverse—Iron Ore Flotation," Iron Ore Conference, Perth, WA, pp. 361-366.
Chipfunhu D. et al. (2012) "Fotation Behaviour of Fine Particles with Respect to Contact Angle," Chemical Engineering Research and Design, 90, pp. 26-32.
Filippov, I.O. et al. (2014) "An Overview of the Benefication of Iron Ores Via Reverse Cationic Flotation," International Journal of Mineral Processing, 127, pp. 62-69.
Houot, R., (1983) "Benefication of Iron Ore by Flotation—Review of Industrial and Potential Applications," International Journal of Mineral Processing, 10, pp. 183-204.
Kent, W. et al. (1985) "Polymer-Stabilized Emulsions and Fine-Particle Recovery, II. The Chalcopyrite-Quartz System," International Journal of Mineral Processing, 14, pp. 217-232.
Kusaka, E. et al. (1994) "The Role of Zeta Potentials of Oil Droplets and Quartz Particles During Collectorless Liquid-Liquid Extraction," International Journal of Mineral Processing, 41, pp. 257-269.
Kusaka, E. et al. (1997) "The Role of Hydrolyzed Metal Cations in the Liquid-Liquid Extraction of Ultrafine Silica With Dodecyl Sulfate," Minerals Engineering, vol. 10, pp. 155-162.
Laskowski, J.S. (1992) "Oil Assisted Fine Particle Processing," Emulsions and Emulsifacation,Chapter 12, pp. 361-394.
Liu, J. et al. (2002) "Fundamental Study of Reactive Oily-Bubble Flotation," Minerals Engineering, 15, pp. 667-676.
Ma, Mark (2012) "Froth Flotation of Iron Ores," International Journal of Mining Engineering and Mineral Processing, 1 (2): pp. 56-61.
Papini, R.M. et al. (2001) "Cationic Flotation of Iron Ores: Amine Characterization and Performance," Minerals & Metallurgical Processing, vol. 18, No. 1, pp. 5-9.
Lai, Ralph W.M. et al. (1968) "Liquid-Liquid Extraction of Ultrafine Particles," Society of Mining Engineers, vol. 241, pp. 549-556.
Ralston, J. et al. (1984) "Polymer-Stabilized Emulsions and Fine-Particle Recovery, I. The Calcite-Quartz System," School of Chemical Technology, pp. 167-186.
Rubio, Jorge et al. (1993) "The Process of Separation of Fine Mineral Particles by Flotation with Hydrophobic Polymeric Carrier," International Journal of Mineral Processing, 37: pp. 109-122.
Sivamohan, R. (1990) "The Problem of Recovering Very Fine Particles in Mineral Processing—A Review," International Journal of Mineral Processing, 28: pp. 247-288.
Song, S. et al. (2001) "Floc Flotation of Galena and Sphalerite Fines," Minerals Engineering, vol. 14, No. 1, pp. 87-98.
Subrahmanyam, T.V. et al. (1990) "Fine Particles Processing: Shear-Flocculation and Carrier Flotation—A Review," International Journal of Mineral Processing, 30: pp. 265-286.
Valderrama, L. et al. (1998) "High Intensity Conditioning and the Carrier Flotation of Gold Fine Particles," International Journal of Mineral Processing, 51: pp. 273-285.
Warren, Leonard J. (1974) "Shear-Flocculation of Ultrafine Scheelite in Sodium Oleate Solutions," Journal of Colloid and Interface Science, vol. 50, No. 2, pp. 307-318.
Warren, L.J. (1992) "Shear-Flocculation," Science Direct, vol. 12, Chapter 10, pp. 309-329.
Yoon, R.H. (1993) "Microbubble Flotation," Minerals Engineering, vol. 6, No. 6, pp. 619-630.
Zachwieja, J.B. (1994) "An Overview of Cationic Reagents in Mineral Processing," Reagents for Better Metallurgy, Chapter 20, pp. 191-202.
Zambrana, G.Z. et al. (1974) "Recovery of Minus Ten Micron Cassiterite by Liquid-Liquid Extraction," International Journal of Mineral Processing, 1: pp. 335-345.
International Search Report for International Application No. PCT/US2017/065978, dated May 8, 2018, 8 pages.
Written Opinion for International Application No. PCT/US2017/065978, dated May 8, 2018, 9 pages.
Kazakhstan Office Action in Application No. 2017/1167.1, dated May 14, 2019, 11 pages (5 pages of Official Copy and 6 pages of English Translation).
Ginzburg O.F., Laboratory work in organic chemistry, 2nd Edition., M .: Higher School, 1974, 144 pages (Second Edition Not Available, No English Translation Available).
Stepanova M.N., Organic reagents in flotation, Perm State Technical University, 2009, 53 pages (No English Translation Available).
Fuerstenau, D.W. (1980) "Fine Particle Flotation," Chapter 35, pp. 669-705.
Office Action in Chinese Application No. 201780073542.3, dated Dec. 11, 2020, 26 pages (15 pages of English Translation & 11 pages of Official Copy).
Dong, Yong-Chun, "Textile Auxiliaries and Chemistry", China Textile Press, p. 114, 2007 (English Translation Enclosed).

* cited by examiner

FUNCTIONALIZED SILICONES FOR FROTH FLOTATION

The present invention relates to improved methods and compositions for froth flotation, in particular for separation of beneficiaries from mineral ores that require particularly fine comminution.

BACKGROUND

The invention relates to novel methods and compositions for improving the effectiveness of froth flotation beneficiation processes. In a beneficiation process, two or more materials which coexist in a mixture of particulate material are separated from each other using mechanical processes with/without chemicals. Often one of the materials, the beneficiary, is more valuable or desired than the other material, the gangue.

One form of beneficiation is froth flotation separation. In froth flotation separation the particulate material is slurried with water (or another solvent or solvent mix) and some chemicals, such as collector, regulators, depressors and/or activators, which are added to selectively make the targeted particles hydrophobic while others are hydrophilic or less hydrophobic. The slurry is then doped with frothing agent (frother) if necessary and sparged to form bubbles, which rise up out of the slurry carrying hydrophobic particles therewith and form a froth layer above the sparged slurry. The froth layer may then be deposited on a launder. The less hydrophobic material remains behind in the slurry.

Two common forms of flotation separation processes are direct flotation and reverse flotation. In direct flotation processes, the froth comprises the beneficiary or concentrate while in reverse flotation processes, the froth comprises gangue or tailings. The object of the flotation in either process is to separate and recover as much as possible of the beneficiary from the particulate material in as high a concentration as possible, which is then made available for further downstream processing steps. In froth flotation, a sparge composition comprising a slurry is sparged to form a froth layer and a sparged slurry. In a direct froth flotation, the froth layer comprises a concentrated beneficiary (a concentrate), and the sparged slurry comprises the tailings (concentrated gangue). In reverse froth flotation, the froth layer comprises tailings and the sparged slurry comprises the concentrated beneficiary. In direct froth flotation, the froth comprises more beneficiary than gangue, and the tailings comprise more gangue than beneficiary. In reverse froth flotation, the froth comprises more gangue than beneficiary and the tailings comprise more beneficiary than gangue.

Froth flotation separation can be used to separate solids from solids (such as the constituents of mine ore), and liquids or semi-solids from solids (such as the separation of bitumen from oil sands).

The prerequisite for flotation separation is the liberation of particles. For flotation of mineral ores, therefore, comminuting (grinding the solids up by such techniques as dry-grinding, wet-grinding, and the like) is often required to liberate minerals. Such extensive grinding or comminution results in a large proportion of ultrafine particles (less than 10 μm). The presence of such ultrafine particles, finely comminuted particulate material, represents a challenge for froth flotation. Ultrafine particles respond poorly to the conventional flotation processes. Poor ores typically contain less beneficiary disseminated more widely in the ore than is the case for high-grade ores, and as a result greater comminution of poor ores to liberate minerals is required than is the case for high-grade ores and more ultrafine particles are generated. Therefore, flotation separation of poor ores remains more challenging.

It would be an advantage to provide for froth flotation (including reverse froth flotation) improved methods and/or compositions that can be implemented in existing froth flotation installations for separation of beneficiary from ores. It would be an advantage to provide improved methods and/or compositions that can be used to concentrate beneficiaries from materials that contain ultrafine particles. It would be particularly advantageous to provide such methods and/or compositions showing improved recovery and improved grade of beneficiary for poor ores.

SUMMARY

In embodiments, there is provided a sparge composition for froth flotation, the sparge composition comprising: (i) a medium; (ii) an ore comprising a beneficiary and a gangue; and (iii) one or more functionalized silicones having the formula (I)

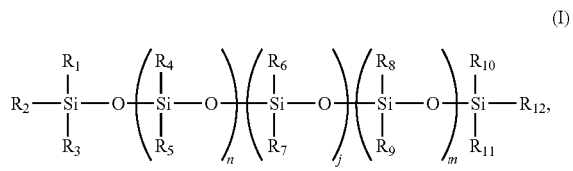

wherein each of $R_1$, $R_2$, $R_3$, $R_4$, $R_5$, $R_6R_7$, $R_8$, $R_9$, $R_{10}R_{11}$, and $R_{12}$ of each of the one or more functionalized silicones is individually selected from linear alkyl, branched alkyl, alicyclic alkyl, aryl, alkaryl, alkoxy, hydroxyalkyl, hydroxyalkoxy, alkoxyalkyl, alkyl ether, hydroxylated polyol, and —$(CH_2)_b$-A wherein b is an integer from 0-20, with the proviso that at least one of $R_1$, $R_2$, $R_3$, $R_4$, $R_5$, $R_6R_7$, $R_8$, $R_9$, $R_{10}R_{11}$, and $R_{12}$ is —$(CH_2)_b$-A, wherein n is from 0 to 700, j is from 0 to 700, and m is from 0 to 700, with the proviso that the sum [n+j+m] is 1-2100, and wherein A is a moiety selected from amino, mercapto, amines, ammonium groups, thiols, carboxylates, sulfates, sulfonates, hydroxamates, sulfosuccinates, sulfosuccinamates, phosphonic esters, phosphoric esters, xanthates, xanthogen formates, dithiophosphinates, trithiocarbonates, dithiophosphates, thiazoles, sulfides, disulfides, and oximes. In some embodiments, A of each of the one or more functionalized silicones is individually selected from —$NH_2$, —$CH(CH_3)CH_2NHCH_2CH_3$, —$NH(CH_2)_2NH_2$, —O—$(CH_2)_3NH(CH_2)_3NH_2$, —$NH_3^+$, —$CH(CH_3)CH_2NH_2^+CH_2CH_3$, —$NH_2^+(CH_2)_2NH_3^+$, and —O—$(CH_2)_3NH_2^+(CH_2)_3NH_3^+$ and the ore comprises silica and/or silicate. In some such embodiments, the sparge composition further comprises an additional collector selected from primary amines, secondary amines, tertiary amines, primary ammonium compounds secondary ammonium compounds, tertiary ammonium compounds, quaternary ammonium compounds, and any combination thereof. In embodiments, the additional collector comprises, consists of, or consists essentially of isotridecyloxypropyl-1,3-diaminopropane.

In other embodiments, A of each of the one or more functionalized silicones is individually selected from mercapto, thiols, xanthates, xanthogen formates, dithiophosphinates, trithiocarbonates, dithiophosphates, thiazoles, sulfides, disulfides, and any combination thereof; and the ore comprises one or more metal sulfide minerals. In some such embodiments, the sparge composition further comprises an additional collector selected from thiols, xanthates, xanthogen formates, dithiophosphinates, trithiocarbonates, dithiophosphates, thiazoles, sulfides, disulfides, and any combination thereof.

In embodiments, there is provided a sparge composition for froth flotation, the sparge composition comprising: (i) a medium; (ii) an ore; and (iii) one or more functionalized silicones selected from

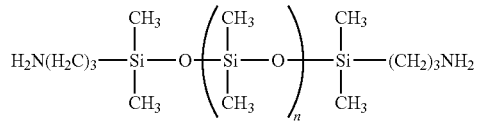
(II)

or a conjugate acid thereof,

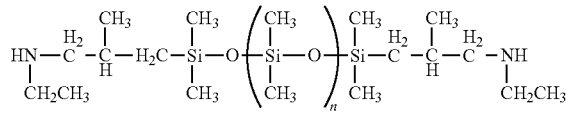
(III)

or a conjugate acid thereof,

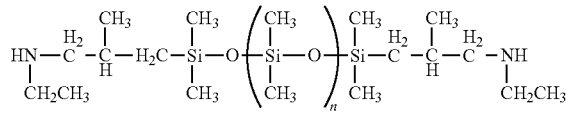
(IV)

or a conjugate acid thereof,

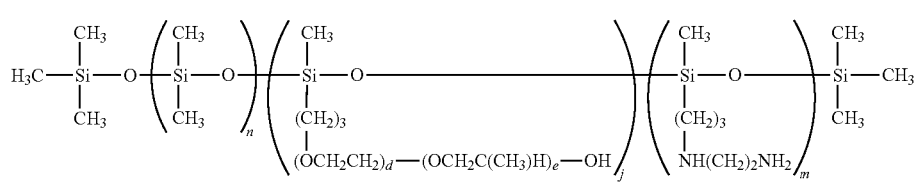
(IX)

or a conjugate acid thereof,

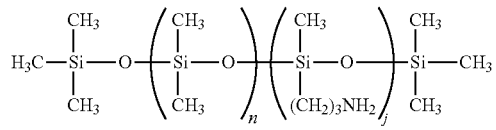
(V)

or a conjugate acid thereof,

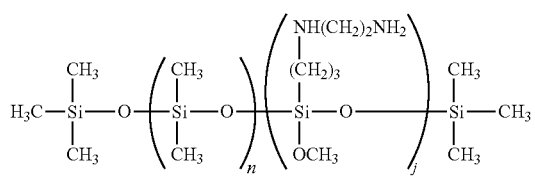
(VI)

or a conjugate acid thereof,

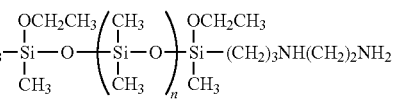
VII or a conjugate acid thereof,

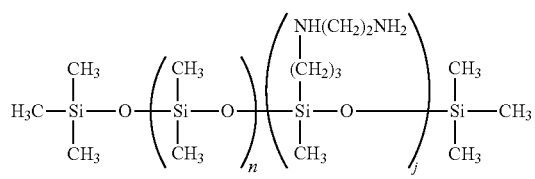
VIII or a conjugate acid thereof,

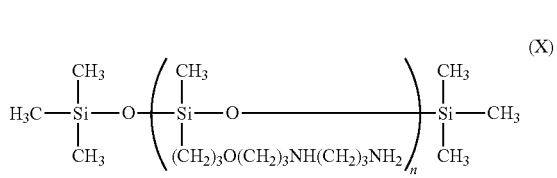
(X)

or a conjugate acid thereof,

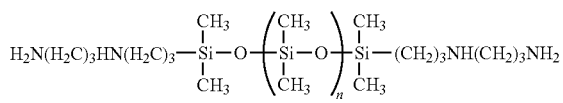

(XI)

or a conjugate acid thereof, and any combination thereof. In some such embodiments, the ore comprises silica and/or silicate. In some such embodiments, the sparge composition further comprises an additional collector selected from primary amines, secondary amines, tertiary amines, primary ammonium compounds secondary ammonium compounds, tertiary ammonium compounds, quaternary ammonium compounds, and any combination thereof. In embodiments, the additional collector comprises, consists of, or consists essentially of isotridecyloxypropyl-1,3-diaminopropane.

In embodiments, there is provided a method of froth flotation comprising sparging any of the sparge compositions described herein to yield a froth and a sparged slurry, wherein either the froth comprises a concentrate and the sparged slurry comprises tailings or the froth comprises tailings and the sparged slurry comprises a concentrate; and separating from the tailings at least some of the concentrate. In embodiments, the method further comprises comminuting a terranean material to obtain the ore; adding the to the medium to make a slurry; and adding to the slurry a functionalized silicone composition comprising the one or more functionalized silicones to form the sparge composition.

In embodiments, there is provided the use of any of the sparge compositions described herein in the beneficiation of an ore by froth flotation.

DETAILED DESCRIPTION

Figure 1:
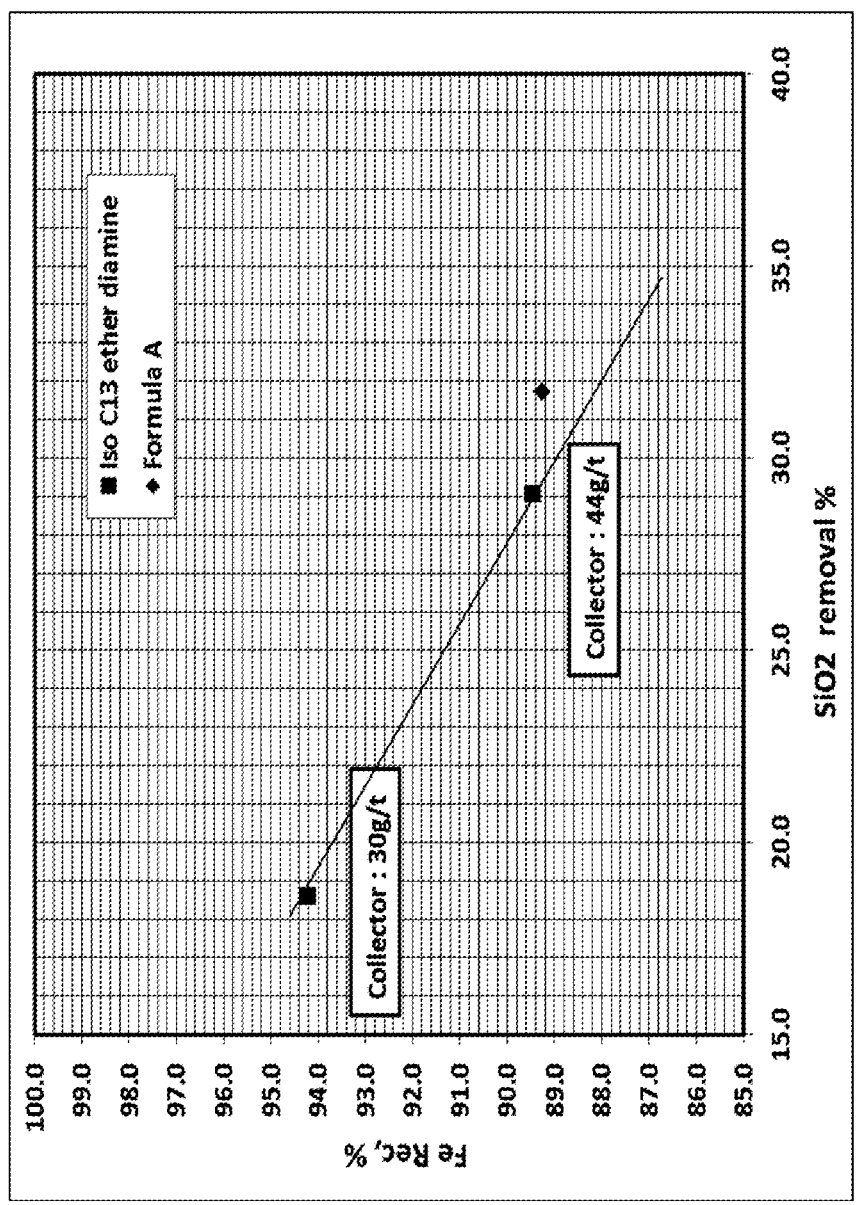
FIG. 1 shows a plot of the percentage of iron recovered versus the percentage of silica removed in the concentrate for the collector iso C13 ether diamine and Formula A of the Examples.

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" or "about 1 to about 5", the recitation means "1 to 5" and "about 1 to about 5" and "1 to about 5" and "about 1 to 5" unless specifically limited by context.

As used herein, "ore" means any solid terranean material of economic value that is obtained by excavation such as quarrying, open-cast mining, or pit mining: "ore" is construed herein to include not only rock, minerals, and mineral aggregates containing one or more metals in elemental and/or chemically compounded forms, but also coal and other solid terranean substances.

As used herein, "particulate" or "particulate material" means a plurality of particles. As used herein, "particle" means a discrete solid object to which can be ascribed physicochemical properties such as volume or mass. In embodiments, the particulate or particulate material comprises at least one particle having a particle size of 10 nm to 5 mm as measured by laser diffraction. In embodiments, the particulate material comprises at least one particle having a particle size of 0.3 nm to 8 µm as measured by dynamic light scattering. In embodiments, the particulate material has an average particle size of 10 nm to 5 mm as measured by laser diffraction. In embodiments, the particulate material has an average particle size of 0.3 nm to 8 µm as measured by dynamic light scattering. In embodiments, a particulate material comprising a particle having a particle size of less than 10 µm by dynamic light scattering is referred to herein as an "ultrafine particle." In embodiments, a particulate material having an average particle size of less than 10 μm by dynamic light scattering is referred to herein as an "ultrafine particle."

As used herein, "comminute" means to powder, pulverize, grind, or otherwise reduce the size of a particle or the average particle size of a particulate material.

As used herein, "concentrate" means an ore in which a beneficiary has been concentrated by a froth flotation process. The concentrate comprises ore having a higher concentration of the beneficiary than the ore in the sparge composition before sparging.

As used herein, "tailings" means an ore in which a gangue has been concentrated by a froth flotation process. The tailings have a higher concentration of the gangue than the ore in the sparge composition before sparging.

As used herein "slurry" means a composition comprising a liquid medium and an ore, wherein particles of the ore are dispersed and/or suspended in the medium, and wherein the composition excludes or substantially excludes a collector and a functionalized silicone. In embodiments, the liquid medium consists essentially of water.

As used herein, the term "sparge composition" means a composition comprising ore, a functionalized silicone, and a liquid medium. Such a composition has a liquid surface and comprises a slurry in the medium. Such a composition, after being sparged, comprises froth at the liquid surface and a sparged slurry. In direct froth flotation, the froth comprises a concentrate, and the sparged slurry comprises tailings. In reverse froth flotation, the froth comprises tailings and the sparged slurry comprises a concentrate.

As used herein, "sparge", "sparged", or "sparging" refers to the introduction of a gas into a sparge composition for the purpose of creating a plurality of bubbles that migrate upwards within the liquid. In embodiments, the gas is air.

As used herein, "sparged composition" means a composition that is produced by sparging a sparge composition. The sparged composition comprises a froth at a liquid surface.

As used herein, "sparged slurry" means a sparged composition excluding the froth.

As used herein, a "collector" means a material that selectively adheres to targeted particles in a sparge composition, and increases adhesion of the targeted particles to the bubbles during sparging.

As used herein, a "functionalized silicone" is a molecule with a silicone-containing hydrophobic backbone and functional group or groups pendant or terminated.

As used herein, a "frother" or "frothing agent" means a composition of matter that reduces the surface tension of water and enables the formation of a stable froth at the surface of a when the sparge composition is sparged.

Discussion

Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

Applicants have discovered improved methods and compositions for froth flotation that can be implemented in existing froth flotation installations for separation of beneficiary and gangue within particulate material comprising, consisting of, or consisting essentially of ultrafine particles. The methods and compositions are effective for separation of beneficiaries from poor ores with improved recovery and grade of beneficiary. Further, Applicants' methods and compositions are adaptable to a variety of ores.

In embodiments, there is provided a functionalized silicone that improves froth flotation of slurries of finely comminuted ore. In embodiments, the functionalized silicone selectively causes targeted particles to agglomerate and/or coagulate into larger aggregates and/or larger particles.

In separation of mineral ores, fine comminution of the ore is required to liberate the beneficiary. However, the resultant ultrafine particles are less ideal for froth flotation. This is especially serious for poor ores that contain a lower proportion of beneficiary to gangue. Applicants have solved this problem.

In embodiments, the functionalized silicone selectively facilitates coagulation and/or agglomeration of targeted particles, resulting in larger particles that are more amenable to separation using froth flotation. In most such embodiments, the functionalized silicone further acts as an efficacious collector for the targeted materials. In a non-limiting example, in some such embodiments an ore is an iron ore comprising a beneficiary consisting essentially of one or more iron compounds and a gangue comprising, consisting of, or consisting essentially of silica and/or silicates. In such embodiments, the functionalized silicone comprises one or more amine groups or ammonium groups. The functionalized silicone agglomerates and/or coagulates particles comprising, consisting of, or consisting essentially of silica and/or silicates and acts as a collector for the silica and/or silicates, the functionalized silicone facilitating separation of the silica and/or silicates as froth by sparging a sparge composition comprising a medium, the amine-functionalized silicone, and the particles of the iron ore-the silica and/or silicates are collected in the froth, and the one or more iron compounds (the beneficiary) are concentrated in the slurry yielding a concentrate therein. Such a process is called a reverse froth flotation.

In another different non-limiting example, in some embodiments an ore is a sulfide ore comprising a beneficiary consisting essentially of one or more sulfur compounds. In such embodiments, a functionalized silicone comprises one or more sulfur-containing functional groups. The functionalized silicone agglomerates and/or coagulates particles of beneficiary comprising, consisting of, or consisting essentially of the one or more sulfide minerals and acts as a collector for the particles of one or more beneficiaries. The functionalized silicone facilitates separation of the one or more sulfide minerals as concentrate in a process comprising: sparging a sparge composition comprising a medium, a sulfur-functionalized silicone, and particles of an ore comprising one or more sulfide minerals-the concentrate collects in a froth and the one or more sulfide minerals concentrate therein. Such a process is called a direct froth flotation.

Therefore in embodiments, there is provided a sparge composition comprising a functionalized silicone, a medium, and a particulate material comprising targeted particles and untargeted particles, wherein the functionalized silicone selectively agglomerates and/or coagulates targeted particles into larger targeted particles and acts as a collector therefor when the sparge composition is sparged with a gas to yield a sparged composition, the sparged composition comprising a sparged slurry having a surface and a froth at the surface thereof, and wherein the gas carries at least some of the larger targeted particles to the froth and the larger targeted particles concentrate therein, and wherein the untargeted particles concentrate in the sparged slurry. In some embodiments, the targeted particles comprise, consists of, or consist essentially of a beneficiary and the untargeted particles comprise, consist of, or consist essentially of a gangue. In other embodiments, the targeted particles comprise, consists of, or consist essentially of a gangue and the untargeted particles comprise, consist of, or consist essentially of a concentrate.

First Embodiments

In first embodiments, there is provided a sparge composition for froth flotation comprising, consisting of, or consisting essentially of a medium, an ore comprising a beneficiary and a gangue, and one or more functionalized silicones having the formula (I)

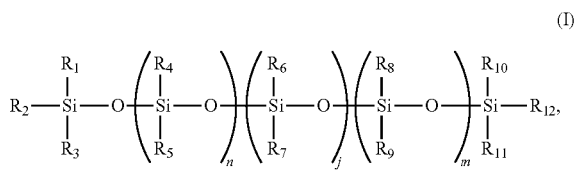

(I)

wherein each of $R_1$, $R_2$, $R_3$, $R_4$, $R_5$, $R_6$, $R_7$, $R_8$, $R_9$, $R_{10}$, $R_{11}$, and $R_{12}$ of each of the one or more functionalized silicones is individually selected from linear alkyl, branched alkyl, alicyclic alkyl, aryl, alkaryl, alkoxy, aryloxy, hydroxyalkyl, hydroxyalkoxy, alkoxyalkyl, alkyl ether, hydroxylated polyol, and —$(CH_2)_b$-A wherein b is an integer from 0-20, with the proviso that at least one of $R_1$, $R_2$, $R_3$, $R_4$, $R_5$, $R_6$, $R_7$, $R_8$, $R_9$, $R_{10}R_{11}$, and $R_{12}$ of each of the one or more functionalized silicones is —$(CH_2)_b$-A, wherein n is from 0 to 700, j is from 0 to 700, and m is from 0 to 700, with the proviso that the sum [n+j+m] is equal to or greater than 1. In embodiments, one to nine of $R_1$, $R_2$, $R_3$, $R_4$, $R_5$, $R_6$, $R_7$, $R_8$, $R_9$, $R_{10}R_{11}$, and $R_{12}$ of at least one of the one or more functionalized silicones is —$(CH_2)_b$—. In embodiments, one to seven of $R_1$, $R_2$, $R_3$, $R_4$, $R_5$, $R_6$, $R_7$, $R_8$, $R_9$, $R_{10}R_{11}$, and $R_{12}$ of at least one of the one or more functionalized silicones is —$(CH_2)_b$—. In embodiments, one to six of $R_1$, $R_2$, $R_3$, $R_4$, $R_5$, $R_6$, $R_7$, $R_8$, $R_9$, $R_{10}R_{11}$, and $R_{12}$ of at least one of the one or more functionalized silicones is —$(CH_2)_b$—. In embodiments, one to five of $R_1$, $R_2$, $R_3$, $R_4$, $R_5$, $R_6$, $R_7$, $R_8$, $R_9$, $R_{10}R_{11}$, and $R_{12}$ of at least one of the one or more functionalized silicones is —$(CH_2)_b$—. In embodiments, four of $R_1$, $R_2$, $R_3$, $R_4$, $R_5$, $R_6$, $R_7$, $R_8$, $R_9$, $R_{10}R_{11}$, and $R_{12}$ of at least one of the one or more functionalized silicones are —$(CH_2)_b$—. In embodiments, three of $R_1$, $R_2$, $R_3$, $R_4$, $R_5$, $R_6$, $R_7$, $R_8$, $R_9$, $R_{10}R_{11}$, and $R_{12}$ of at least one of the one or more functionalized silicones are —$(CH_2)_b$—. In embodiments, two of $R_1$, $R_2$, $R_3$, $R_4$, $R_5$, $R_6$, $R_7$, $R_8$, $R_9$, $R_{10}R_{11}$, and $R_{12}$ of at least one of the one or more functionalized silicones are —$(CH_2)_b$—. In embodiments, $R_2$ and $R_{12}$ of at least one of the one or more functionalized silicones have the formula —$(CH_2)_b$-A, and each of $R_1$, $R_3$, $R_4$, $R_5$, $R_6$, $R_7$, $R_8$, $R_9$, $R_{10}$, and $R_{11}$ is selected from alkyl and alkoxy. In embodiments, $R_5$ of at least one of the one or more functionalized silicones has the formula —$(CH_2)_b$-A, and each of $R_1$, $R_2$, $R_3$, $R_4$, $R_6$, $R_7$, $R_8$, $R_9$, $R_{10}$, $R_{11}$, and $R_{12}$ is selected from alkyl and alkoxy. In embodiments $R_7$ of at least one of the one or more functionalized silicones has the formula —$(CH_2)_b$-A, and each of $R_1$, $R_2$, $R_3$, $R_4$, $R_5$, $R_6$, $R_8$, $R_9$, $R_{10}$, $R_{11}$, and $R_{12}$ is selected from alkyl and alkoxy. In embodiments, $R_5$ and $R_7$ of at least one of the one or more functionalized silicones have the formula —$(CH_2)_b$-A, and each of $R_1$, $R_2$, $R_3$, $R_4$, $R_6$, $R_8$, $R_9$, $R_{10}$, $R_{11}$, and $R_{12}$ is selected from alkyl and alkoxy. In embodiments, $R_5$, $R_7$, and $R_9$ of at least one of the one or more functionalized silicones have the formula —$(CH_2)_b$-A, and each of $R_1$, $R_2$, $R_3$, $R_4$, $R_6$, $R_8$, $R_{10}$, $R_{11}$, and $R_{12}$ is selected from alkyl and alkoxy.

In embodiments, $R_2$, $R_5$, and $R_{12}$ of at least one of the one or more functionalized silicones have the formula —$(CH_2)_b$-A, and each of $R_1$, $R_3$, $R_4$, $R_6$, $R_7$, $R_8$, $R_9$, $R_{10}$, and $R_{11}$ is selected from alkyl and alkoxy. In embodiments $R_2$, $R_7$, and $R_{12}$ of at least one of the one or more functionalized silicones have the formula —$(CH_2)_b$-A, and each of $R_1$, $R_3$, $R_4$, $R_5$, $R_6$, $R_8$, $R_9$, $R_{10}$, and $R_{11}$ is selected from alkyl and alkoxy. In embodiments, $R_2$, $R_5$, $R_7$, and $R_{12}$ of at least one of the one or more functionalized silicones have the formula —$(CH_2)_b$-A, and each of $R_1$, $R_3$, $R_4$, $R_6$, $R_8$, $R_9$, $R_{10}$, and $R_{11}$ is selected from alkyl and alkoxy. In embodiments, $R_2$, $R_5$, $R_7$, $R_9$, and $R_{12}$ of at least one of the one or more functionalized silicones have the formula —$(CH_2)_b$-A, and each of $R_1$, $R_3$, $R_4$, $R_6$, $R_8$, $R_{10}$, and $R_{11}$ is selected from alkyl and alkoxy. In embodiments, b=1 for at least one of the one or more functionalized silicones, in embodiments b=2, in embodiments b=3. In embodiments, b=0 for at least one of the one or more functionalized silicones. In embodiments, b>0 for each of the one or more functionalized silicones. In embodiments, b is an integer between 3 and 10 for at least one of the one or more functionalized silicones. In embodiments, b is an integer between 11 and 20 for at least one of the one or more functionalized silicones. In embodiments, for at least one of the one or more functionalized silicones n is between 0 and 40, j is between 0 and 40, and m is between 0 and 40, with the proviso that the sum [n+j+m] is from 1 to 120. In embodiments, for at least one of the one or more functionalized silicones, one of n, m, and j is 0. In embodiments for at least one of the one or more functionalized silicones, two of n, m, and j are zero.

In embodiments, $R_3$, $R_5$, $R_6$, and $R_{11}$ of at least one of the one or more functionalized silicones are alkyl. In some such embodiments, $R_3$, $R_5$, $R_6$, and $R_{11}$ of the at least one of the one or more functionalized silicones are C1-C4 alkyl. In some such embodiments, $R_3$, $R_5$, $R_6$, and $R_{11}$ of the at least one of the one or more functionalized silicones are methyl. In embodiments, $R_3$, $R_5$, $R_6$, and $R_{11}$ of the at least one of the one or more functionalized silicones are ethyl.

In embodiments, $R_4$ of at least one of the one or more functionalized silicones is —$(CH_2)_b$-A. In embodiments, $R_7$ of at least one of the one or more functionalized silicones is —$(CH_2)_b$-A. In embodiments, $R_8$ of at least one of the one or more functionalized silicones is —$(CH_2)_b$-A. In embodiments, $R_9$ of at least one of the one or more functionalized silicones is —$(CH_2)_b$-A. In embodiments, $R_{10}$ of at least one of the one or more functionalized silicones is —$(CH_2)_b$-A.

In embodiments, the number average molecular weight of each of the one or more functionalized silicones is between 200 and 20,000.

In embodiments, the medium comprises, consists of, or consists essentially of water.

In embodiments, the ore comprises, consists of, or consists essentially of silicate, carbonate, sulfide, oxide, mineral containing sulfo group, phosphate, spodumene, barite, celestite, kainite, gypsum, anhydrite, pyrochlore, casserite, ilmenite, rare earth mineral, copper mineral, iron mineral, apatite, scheelite, rutile, perovskite, zircon, gold-bearing sulfides, molybdenum mineral, enargite, copper-molybdenum ore, copper-nickel ore, lead mineral, copper-lead mineral, zinc mineral, or mixtures thereof.

Second Embodiments

In second embodiments, there is provided a sparge composition for froth flotation comprising, consisting of, or consisting essentially of a medium, an ore, and a functionalized silicone having the formula (XII)

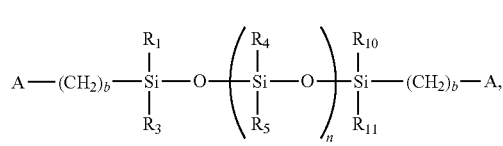
(XII)

wherein each of $R_1$, $R_3$, $R_4$, $R_5$, $R_{10}$, and $R_{11}$, is selected from linear alkyl, branched alkyl, alicyclic alkyl, aryl, alkaryl, alkoxy, aryloxy, hydroxyalkyl, hydroxyalkoxy, alkoxyalkyl, alkyl ether, and hydroxylated polyol; wherein n is between 10 and 700, b is an integer from 0-20, and wherein A is a moiety selected from amino, mercapto, amines, ammonium groups, thiols, carboxylates, sulfates, sulfonates, hydroxamates, sulfosuccinates, sulfosuccinamates, phosphonic esters, phosphoric esters, xanthates, xanthogen formates, dithiophosphinates, trithiocarbonates, dithiophosphates, and oximes.

In embodiments each of $R_1$, $R_3$, $R_4$, $R_5$, $R_{10}$, and $R_{11}$ is selected from alkyl and alkoxy. In embodiments, $R_3$, $R_4$, $R_5$, and $R_{11}$ are alkyl groups and $R_1$ and $R_{10}$ are alkoxy. In embodiments, $R_3$, $R_4$, $R_5$, and $R_{11}$ are methyl groups and $R_1$ and $R_{10}$ are ethoxy. In embodiments $R_1$, $R_3$, $R_4$, $R_5$, $R_{10}$, and $R_{11}$ are all alkyl. In embodiments, $R_1$, $R_3$, $R_4$, $R_5$, $R_{10}$, and $R_{11}$ are the same alkyl. In embodiments, $R_1$, $R_3$, $R_4$, $R_5$, $R_{10}$, and $R_{11}$ are all alkyl, and at least two of $R_1$, $R_3$, $R_4$, $R_5$, $R_{10}$, and $R_{11}$ are different from each other. In embodiments, $R_1$, $R_3$, $R_4$, $R_5$, $R_{10}$, and $R_{11}$ are all methyl groups. In embodiments, $R_1$, $R_3$, $R_4$, $R_5$, $R_{10}$, and $R_{11}$ are all ethyl groups.

In embodiments b=1, in embodiments b=2, in embodiments b=3.

Third Embodiments

In third embodiments, there is provided a sparge composition for froth flotation comprising, consisting of, or consisting essentially of a medium, an ore, and a functionalized silicone having the formula (XIII)

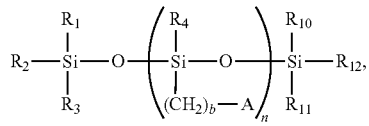
(XIII)

wherein each of $R_1$, $R_2$, $R_3$, $R_4$, $R_{10}$, $R_{11}$, and $R_{12}$ is selected from linear alkyl, branched alkyl, alicyclic alkyl, aryl, alkaryl, alkoxy, aryloxy, hydroxyalkyl, hydroxyalkoxy, alkoxyalkyl, alkyl ether, and hydroxylated polyol; wherein n is between 10 and 700, b is an integer from 0-20, and wherein A is a moiety selected from amino, mercapto, amines, ammonium groups, thiols, carboxylates, sulfates, sulfonates, hydroxamates, sulfosuccinates, sulfosuccinamates, phosphonic esters, phosphoric esters, xanthates, xanthogen formates, dithiophosphinates, trithiocarbonates, dithiophosphates, and oximes.

In embodiments each of $R_1$, $R_2$, $R_3$, $R_4$, $R_{10}$, $R_{11}$, and $R_{12}$ is selected from alkyl and alkoxy. In embodiments, $R_1$, $R_2$, $R_3$, $R_4$, $R_{10}$, $R_{11}$, and $R_{12}$ are all alkyl groups. In embodiments, $R_1$, $R_2$, $R_3$, $R_4$, $R_{10}$, $R_{11}$, and $R_{12}$ are all the same type of alkyl group. In embodiments, at least two of $R_1$, $R_2$, $R_3$, $R_4$, $R_{10}$, $R_{11}$, and $R_{12}$ are different from each other. In embodiments, $R_1$, $R_2$, $R_3$, $R_4$, $R_{10}$, $R_{11}$, and $R_{12}$ are all methyl groups. In embodiments $R_1$, $R_2$, $R_3$, $R_{10}$, $R_{11}$, and $R_{12}$ are all alkyl groups and $R_4$ is an alkoxy group selected from methoxy and ethoxy.

In embodiments b=1, in embodiments b=2, in embodiments b=3.

Fourth Embodiments

In fourth embodiments, there is provided a sparge composition for froth flotation comprising, consisting of, or consisting essentially of a medium, an ore, and a functionalized silicone having the formula (XIV)

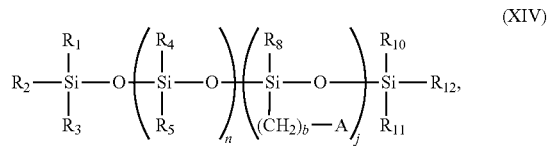
(XIV)

wherein each of $R_1$, $R_2$, $R_3$, $R_4$, $R_5$, $R_6$, $R_{10}R_{11}$, and $R_{12}$ is selected from linear alkyl, branched alkyl, alicyclic alkyl, aryl, alkaryl, alkoxy, hydroxyalkyl, hydroxyalkoxy, alkoxyalkyl, alkyl ether, and hydroxylated polyol; wherein n is between 10 and 700, j is between 10 and 700, b is an integer from 0-20, and wherein A is a moiety selected from amino, mercapto, amines, ammonium groups, thiols, carboxylates, sulfates, sulfonates, hydroxamates, sulfosuccinates, sulfosuccinamates, phosphonic esters, phosphoric esters, xanthates, xanthogen formates, dithiophosphinates, trithiocarbonates, dithiophosphates, and oximes.

In embodiments, each of $R_1$, $R_2$, $R_3$, $R_4$, $R_5$, $R_6$, $R_{10}R_{11}$, and $R_{12}$ is selected from alkyl and alkoxy. In embodiments, $R_1$, $R_2$, $R_3$, $R_4$, $R_5$, $R_6$, $R_{10}R_{11}$, and $R_{12}$ are all alkyl groups. In embodiments, $R_1$, $R_2$, $R_3$, $R_4$, $R_5$, $R_6$, $R_{10}R_{11}$, and $R_{12}$ are all the same type of alkyl group. In embodiments, $R_1$, $R_2$, $R_3$, $R_4$, $R_5$, $R_6$, $R_{10}R_{11}$, and $R_{12}$ are all methyl. In embodiments, $R_1$, $R_2$, $R_3$, $R_4$, $R_5$, $R_{10}$, $R_{11}$, and $R_{12}$ are alkyl and $R_6$ is alkoxy. In embodiments, $R_1$, $R_2$, $R_3$, $R_4$, $R_5$, $R_{10}$, $R_{11}$, and $R_{12}$ are methyl and $R_6$ is methoxy.

In embodiments, b=1, in embodiments b=2, in embodiments b=3.

Fifth Embodiments

In fifth embodiments, there is provided a sparge composition for froth flotation comprising, consisting of, or consisting essentially of a medium, an ore, and a functionalized silicone having the formula (XV)

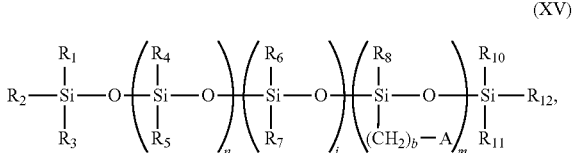
(XV)

wherein each of $R_1$, $R_2$, $R_3$, $R_4$, $R_5$, $R_6$, $R_7$, $R_8$, $R_{10}R_{11}$, and $R_{12}$ is selected from linear alkyl, branched alkyl, alicyclic alkyl, aryl, alkaryl, alkoxy, hydroxyalkyl, hydroxyalkoxy, alkoxyalkyl, alkyl ether, and hydroxylated polyol;

wherein n is between 10 and 700, j is between 10 and 700, m is between 10 and 700, b is an integer from 0-20, and wherein A is a moiety selected from amino, mercapto, amines, ammonium groups, thiols, carboxylates, sulfates, sulfonates, hydroxamates, sulfosuccinates, sulfosuccinamates, phosphonic esters, phosphoric esters, xanthates, xanthogen formates, dithiophosphinates, trithiocarbonates, dithiophosphates, thiazoles, sulfides, disulfides, and oximes.

In embodiments, $R_1$, $R_2$, $R_3$, $R_4$, $R_5$, $R_6$, $R_7$, $R_8$, $R_{10}R_{11}$, and $R_{12}$ are all alkyl groups. In embodiments, $R_1$, $R_2$, $R_3$, $R_4$, $R_5$, $R_6$, $R_7$, $R_8$, $R_{10}R_{11}$, and $R_{12}$ are all the same alkyl group. In embodiments, at least two of $R_1$, $R_2$, $R_3$, $R_4$, $R_5$, $R_6$, $R_7$, $R_8$, $R_{10}R_{11}$, and $R_{12}$ are different from each other. In embodiments, $R_1$, $R_2$, $R_3$, $R_4$, $R_5$, $R_6$, $R_7$, $R_8$, $R_{10}R_{11}$, and $R_{12}$ are all methyl groups. In embodiments, $R_1$, $R_2$, $R_3$, $R_4$, $R_5$, $R_6$, $R_8$, $R_{10}R_{11}$, and $R_{12}$ are all alkyl groups and $R_7$ is an alkoxy group.

Sixth Embodiments-Ore Comprising Silica, Silicates, or a Combination Thereof

In sixth embodiments, there is provided the sparge composition of the first, second, third, fourth, or fifth embodiments, wherein the ore comprises a beneficiary and a gangue, and the gangue comprises, consist of, or consists essentially of silica, a silicate, or a combination thereof and —A of each of the one or more functionalized silicones comprises, consists of, or consists essentially of a moiety with one or more amine groups, one or more ether amine groups, one or more ammonium groups, or a combination thereof. In some such embodiments, the beneficiary comprises, consists of, or consists essentially of iron oxide. The iron oxide can be any oxide of iron. In embodiments the beneficiary comprises iron (II), iron (III) or any combination thereof and oxide.

In embodiments, there is provided the sparge composition of the first, second, third, fourth, or fifth embodiments, wherein the ore comprises silica, silicate, or a combination thereof and b is individually selected from 1, 2 and 3, and A is individually selected from —$NH_2$, —$CH(CH_3)$$CH_2NHCH_2CH_3$, —$NH(CH_2)_2NH_2$, —O—$(CH_2)_3NH(CH_2)_3NH_2$, —$NH_3^+$, —$CH(CH_3)CH_2NH_2^+CH_2CH_3$, —$NH_2^+(CH_2)_2NH_3^+$, and —O—$(CH_2)_3NH_2^+(CH_2)_3NH_3^+$.

In some sixth embodiments, the ore is comminuted iron ore comprising silica, silicates, or a combination thereof. In such ores, reverse froth flotation (wherein the beneficiary is more concentrated than the gangue in the slurry, and the gangue is more concentrated than the beneficiary in the froth) is used to separate silica, silicates, or a combination thereof (a gangue) from various iron compounds including iron oxides (the beneficiary). In some such embodiments, the functionalized silicone comprises nitrogen functionality such as amino and/or ammonium functionality. In some such embodiments, A is individually selected from —$NH_2$, —$CH(CH_3)CH_2NHCH_2CH_3$, —$NH(CH_2)_2NH_2$, —O—$(CH_2)_3NH(CH_2)_3NH_2$, —$NH_3^+$, —$CH(CH_3)CH_2NH_2^+CH_2CH_3$, —$NH_2^+(CH_2)_2NH_3^+$, and —O—$(CH_2)_3NH_2^+(CH_2)_3NH_3^+$.

In some embodiments, A of each of the one or more functionalized silicones comprises an amino group, an ammonium group, or a combination thereof and the ore comprises silica, silicate, or a combination thereof. In some such embodiments, the amino group is individually selected from primary amino, secondary amino, tertiary amino, and any combination thereof. In some embodiments, the ore comprises iron ore and the iron ore comprises silica and/or silicate. In some such embodiments, the sparge composition further comprises a collector selected from fatty amine compounds, ether amines, and mixtures thereof. Non-limiting examples of ether amines are disclosed in Swedish patent 421177 and PCT Patent Application Publication No. WO 2008/077849; and in U.S. Pat. Nos. 6,076,682 and 8,701,892, all of which are incorporated by reference herein in their entirety.

The performance of amines in froth flotation applications is affected by the structural features of the ether amine such as length of carbon chain, number of amine groups, degree of pH neutralization, and branching of the carbon chain. Further, the performance of the ether amine in a sparge composition may be affected by the pH and/or temperature of the composition.

In embodiments, the sparge composition comprises a collector selected from an ether mono amine, an ether diamine, an ether polyamine, a fatty monoamine, a fatty diamine, and a mixture thereof. In some such embodiments, the collector comprises, consists of, or consists essentially of isotridecyloxypropyl-1,3-diaminopropane.

Seventh Embodiments-Ore Comprising Sulfides

In sixth embodiments, there is provided the sparge composition of the first, second, third, fourth, or fifth embodiments, wherein the ore comprises one or more sulfur compounds and —A comprises, consists of, or consists essentially of a sulfur moiety. In embodiments, the ore comprises a sulfide, in embodiments a metal sulfide. In embodiments, the sulfur moiety is selected from xanthates, xanthogen formates, thionocarbamates, dithiophosphates, sodium salts of dithiophosphates, zinc salts of dithiophosphates, thiols, mercaptobenzothiazoles, sulfides, disulfides, and a combination thereof. In embodiments, the sulfur moiety comprises a group selected from —SH, —S—,

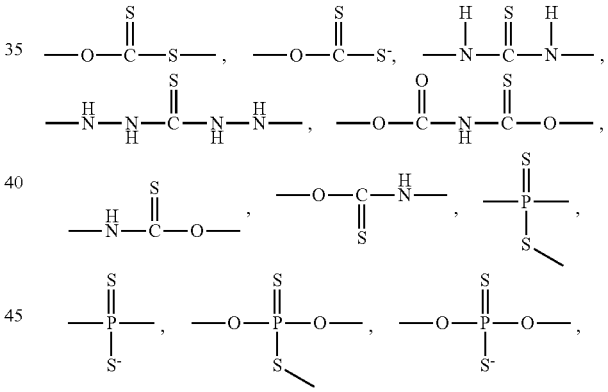

and combinations thereof.

In embodiments, the sparge composition comprises ore, wherein the ore comprises, consists of, or consists essentially of one or more sulfides and A of each of the one or more functionalized silicones is a moiety individually selected from thiols, carboxylates, sulfates, sulfonates, hydroxamates, sulfosuccinates, sulfosuccinamates, phosphonic esters, phosphoric esters, xanthates, xanthogen formates, dithiophosphinates, trithiocarbonates, dithiophosphates, sulfides, disulfides, thionocarbamates, oximes, and combinations thereof. In some such embodiments, A comprises one or more thiol groups. In any embodiments wherein the ore comprises, consists of, or consists essentially of one or more sulfides, in some embodiments the sparge composition further comprises a collector selected from xanthates, xanthogen formates, thionocarbamates, dithiophosphates, sodium salts of dithiophosphates, zinc salts of dithiophosphates, thiols, mercaptobenzothiazoles, ethyl octyl sulfide, and any combination thereof.

Eighth Embodiments

In embodiments, there is provided a sparge composition comprising a medium, an ore, and one or more functionalized silicones.

In embodiments, at least one of the one or more functionalized silicones has the structure (II), wherein n=1 to 700, in embodiments n=2; in embodiments, at least one of the one or more functionalized silicones has the structure (III), wherein n=1 to 700; in embodiments, at least one of the one or more functionalized silicones has the structure (IV), wherein n=1 to 700 and j=1 to 700; in embodiments, at least one of the one or more functionalized silicones has the structure (V), wherein n=1 to 700 and j=1 to 700; in embodiments, at least one of the one or more functionalized silicones has the structure (VI), wherein n=1 to 700 and j=1 to 700; in embodiments, at least one of the one or more functionalized silicones has the structure (VII); in embodiments, at least one of the one or more functionalized silicones has the structure (VIII), wherein n=1 to 700; in embodiments, at least one of the one or more functionalized silicones has the structure (IX), wherein n=1 to 700, j=1 to 700, and m=1 to 700, d is 1 to 20, in embodiments d=1-4 and e is 1 to 20, in embodiments e=1-4; in embodiments, at least one of the one or more functionalized silicones has the structure (X), wherein n=1 to 700; in some embodiments, at least one of the one or more functionalized silicones has the structure (XI), wherein n=1 to 700.

In embodiments, there is provided a sparge composition comprising a medium, an ore, and one or more functionalized silicones selected from

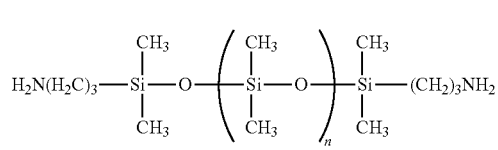
(II)

or a conjugate acid thereof,

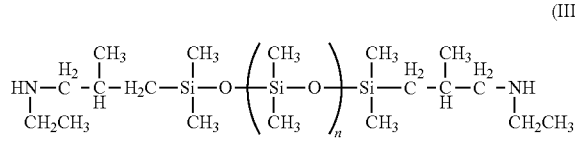
(III)

or a conjugate acid thereof,

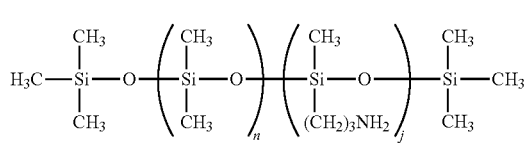
(IV)

or a conjugate acid thereof,

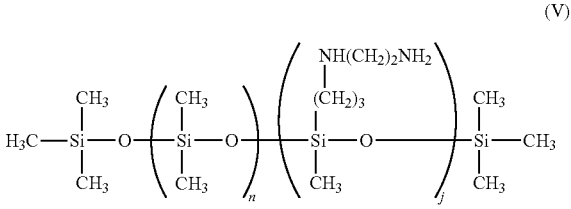
(V)

or a conjugate acid thereof,

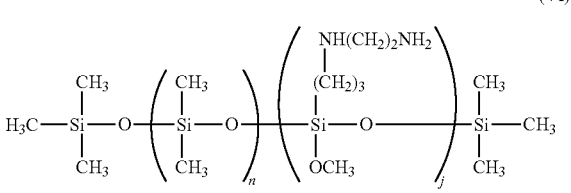
(VI)

or a conjugate acid thereof,

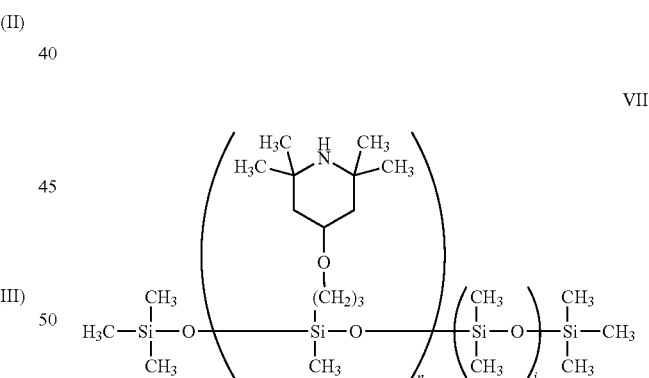
VII or a conjugate acid thereof,

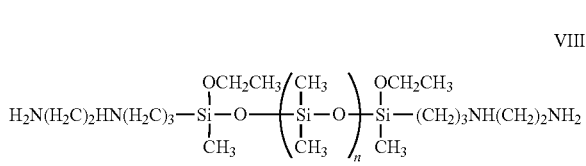
VIII or a conjugate acid thereof,

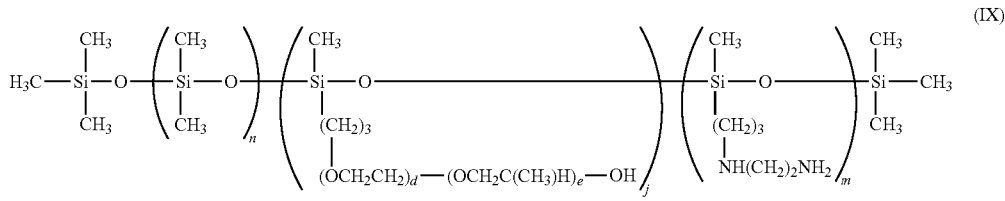

or a conjugate acid thereof,

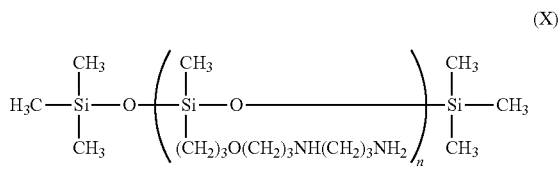

or a conjugate acid thereof,

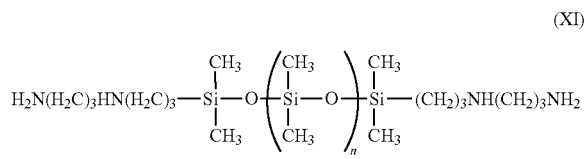

or a conjugate acid thereof, and any combination thereof, wherein n is between 1 and 700, j is between 1 and 700, m is between 1 and 700, d is from 1 to 20, and e is from 1 to 20. In embodiments, d is 1-4 and e is 1-4.

In embodiments, the sparge composition further comprises a collector selected from those disclosed in pages 5-40 of Bulatovic, S. M. Ed., *Handbook of Flotation Reagents* Vol. 1. Elsevier. In some such embodiments, the collector is selected from primary, secondary, and tertiary amines and their ammonium salts, ether amines, fatty amines, amine condensates, amphoteric amine carboxylic compounds, and any combination thereof.

In embodiments, the ore comprises a beneficiary and a gangue, the gangue comprising, consisting of, or consisting essentially of a silicate, silica, or mixtures thereof. In some such embodiments, the beneficiary comprises iron oxide. The iron oxide can be any iron oxide. In embodiments, the beneficiary comprises iron (II), iron (III) or any combination thereof and oxide.

Ninth Embodiments

In embodiments, there is provided any one of the sparge compositions of the first to eighth embodiments further comprising one or more surfactants, one or more additional collectors, one or more dispersants, one or more depressants, one or more promoters, one or more frothing agents, one or more pH adjusting reagents, or combinations thereof. In embodiments, the one or more frothing agents is selected from methyl isobutyl carbinol, pine oil, polyglycols, polyglycol ethers, polypropylene glycol ethers, polyoxyparaffins, phenols, cresols and xylenols. In embodiments, there is provided any one of the sparge compositions of the first to eighth embodiments further comprising methyl isobutyl carbinol, propylene glycol ether, isopropyl alcohol, oleyl diamine, methyl isobutyl carbinol, or any combination thereof.

In ninth embodiments, any of the sparge compositions of the first to eleventh embodiments comprises isotridecyloxypropyl-1,3-diaminopropane and further comprises a frother selected from polypropylene glycol ether, isopropyl alcohol, oleyl diamine, methyl isobutyl carbinol, and any combination thereof.

The performance of collectors can be enhanced by the use of modifiers such as promoters and/or depressants. A promoter increases the adsorption of a collector onto a given mineral such as a concentrate. A depressant hinders or prevents a collector from adsorbing onto a given mineral such as a tailings. One means by which promoters effect increased adsorption of a collector onto a mineral is by enhancing the dispersion of the collector within the sparge composition. A second means is by increasing the adhesion between hydrophobic particles and gas bubbles from sparging. One means by which a depressant hinders or prevents a collector from adsorbing onto a given mineral is by increasing the hydrophilicity of the mineral.

Frothing agents or frothers are chemicals added to a sparge composition that change the surface tension of the sparge composition. Frothers can act to stabilize gas bubbles such as air bubbles so that they form a stable froth at the surface of the sparge composition when the sparge composition is sparged. The stable froth is sufficiently stable that the froth can be removed with concentrate before the bubbles burst. Ideally, the frothing agent should not enhance the flotation of the tailings and the froth should have a tendency to break down when removed from the sparged sparge composition. Collectors are typically added before frothers. Commonly used frothing agents include pine oil, aliphatic alcohols such as methyl isobutyl carbinol, polyglycols, polyglycol ethers, polypropylene glycol ethers, polyoxyparaffins, and cresylic acid.

Tenth Embodiments

In embodiments, there is provided a method of froth flotation comprising: sparging the sparge composition of any one of the first, second, third, fourth, fifth, sixth, seventh, eighth, or ninth embodiments to yield a froth and a sparged slurry, wherein either the froth comprises a concentrate and the sparged slurry comprises tailings or the froth comprises tailings and the sparged slurry comprises concentrate; and separating from the tailings at least some of the concentrate. In embodiments, there is provided a method of froth flotation, the method comprising: forming the sparge composition of any of the first, second, third, fourth, fifth, sixth, seventh, eighth, or ninth embodiments; sparging the sparge composition to form a sparged composition, the sparged composition comprising a froth and a sparged slurry. In embodiments, the froth comprises a concentrate and the sparged slurry comprises tailings and/or the froth comprises tailings and the sparged slurry comprises a beneficiary, and the method further comprises separating at least a portion of the concentrate from the sparged composition.

Sparging the sparge composition yields a froth and a sparged slurry. The sparged slurry comprises a body of liquid having a surface, wherein the froth is disposed at the surface immediately following sparging. Separating from the tailings at least a portion of the concentrate is accomplished by removing froth from the surface of the sparged slurry, removing solid material from the body of the sparged slurry, by other techniques and methods known in the art, or any combination thereof.

In embodiments, the method further comprises forming the sparge composition of any one of the first, second, third, fourth, fifth, sixth, seventh, eighth, or ninth embodiments. In any of the embodiments described herein, the ore in the sparge composition can comprise, consists of, or consist essentially of a particulate material. In some such embodiments, the method further comprises comminuting a raw ore to obtain the ore, wherein the ore consists of, or consists essentially of a particulate; adding the ore to the medium to make a slurry; and adding to the slurry a functionalized silicone composition comprising the one or more functionalized silicones to form the sparge composition. In embodiments, the method further comprises conditioning the slurry with a depressant and/or activator and/or frother. In embodiments, the comminuting the raw ore reduces the average particle size of the particles below 5 mm in the particulate, as measured by laser diffraction, by a factor of 100000 to 10000, in embodiments 10000 to 1000, in embodiments 1000 to 100, in embodiments 100 to 10, or in embodiments 10 to 1.5.

In embodiments, the method comprises forming a sparge composition, the sparge composition comprising a medium comprising water, an ore comprising a beneficiary and a gangue, and one or more functionalized silicones having the formula

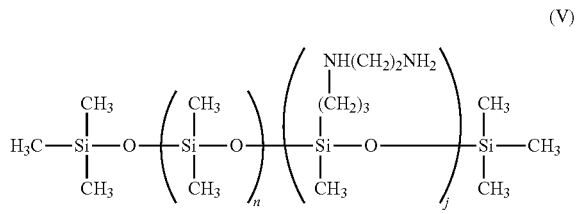

(V)

or a conjugate acid thereof, wherein n is 0 to 2, and j is 2 to 4; and
sparging the sparge composition to yield a sparged composition. In some such embodiments, the beneficiary comprises an iron oxide and the gangue comprises silica, silicate, or a combination thereof. In embodiments, the sparged composition comprises a froth and a sparged slurry, the froth comprises tailings of the gangue and the sparged slurry comprises a concentrate of the beneficiary, and the method further comprises separating at least a portion of the concentrate from the sparged slurry. In embodiments, the sparge composition further comprises isotridecyloxypropyl-1,3-diaminopropane. In some such embodiments, the sparge composition further comprises a frother selected from methyl isobutyl carbinol, polypropylene glycol ether, isopropyl alcohol, and oleyl diamine.

Eleventh Embodiments

In embodiments, there is provided the use of any one of the sparge compositions of the first to ninth embodiments in the beneficiation of an ore.

Further Discussion of the Embodiments

In froth flotation, the chemical nature of the collector affects the recovery and grade of beneficiary. The selection of collector with a specific functional group depends on the chemical nature of particulate material. In general, the role of a collector in the process of froth flotation is to improve hydrophobicity of targeted particles and hence improve the affinity of the targeted particles to the sparge bubbles, thereby improving efficiency of separation of the concentrate and tailings. The present invention advantageously allows for the tailoring of the functionalized silicone of the sparge composition to meet the need of the particular particle system in the sparge composition.

In general, a particular chemical class of collector is suited or matched to a particular chemical class of targeted particles, thus improving the affinity of the sparge bubbles therefor. Particular classes of collector showing affinity for particular classes of collector are disclosed in pages 5-40 of Bulatovic, S. M. Ed., *Handbook of Flotation Reagents* Vol. 1. Elsevier. In embodiments, the group A of any of the first, second, third, fourth, or fifth embodiments is selected to match the targeted materials.

In embodiments, the one or more functionalized silicones of the first to ninth embodiments consists of or consists essentially of one functionalized silicone. In embodiments, the one or more functionalized silicones comprises, consists of, or consists essentially of two or more different functionalized silicones, each functionalized silicone having the general formula (I). In embodiments, each functionalized silicone has a formula individually selected from (XII), (XIII), (XIV), and (XV).

In any of the first, second, third, fourth, or fifth embodiments, in embodiments A in each of the one or more functionalized silicones is a moiety individually selected from amino, amines, and ammonium groups. In any of the first, second, third, fourth, or fifth embodiments, in embodiments A in each of the one or more functionalized silicones is a moiety individually selected from mercapto groups, thiols, xanthates, xanthogen formates, dithiophosphinates, trithiocarbonates, and dithiophosphates. In any of the first, second, third, fourth, or fifth embodiments, in embodiments A in each of the one or more functionalized silicones is a moiety individually selected from carboxylates, sulfates, sulfonates, hydroxamates, sulfosuccinates, sulfosuccinamates, phosphonic esters, phosphoric esters, xanthates, xanthogen formates, dithiophosphinates, trithiocarbonates, dithiophosphates, and oximes.

In some embodiments, the group A is a functional group. Non-limiting examples of such functional groups include —NH$_2$, and —SH. In some embodiments, A is a moiety that is an organic structure comprising a functional group. One non-limiting example of such a moiety is —S—R, where R is an alkyl group. In embodiments, A is a moiety selected from carboxylates, alkyl sulfates, sulfonates, hydroxamates, sulfosuccinates, sulfosuccinamates, phosphonic acids, phosphoric acid esters, thiols, phosphoric acid, organic sulfides, xanthates, xanthic acids, xanthogen formates, dialkyldixanthogenates, O—N-dialkylthionocarbamates, mercaptobenzothiazoles, thiocarbamates and modified thiocarbamates, dithiophosphinates, trithiocarbonates, substituted mercaptobenzothiozoles, dithiophosphates, primary, secondary, and tertiary amines, primary, secondary, tertiary, and quaternary ammonium compounds, fatty amines, and ether amines.

In any one of the first, second, third, fourth, fifth, sixth, seventh, eighth, ninth, tenth, or eleventh embodiments, in embodiments the sparge composition further comprises a collector selected from carboxylates, alkyl sulfates, sulfonates, hydroxamates, sulfosuccinates, sulfosuccinamates, phosphonic acids, phosphoric acid esters, thiols, phosphoric acid, organic sulfides, xanthates, xanthic acids, xanthogen formates, dialkyldixanthogenates, O—N-dialkylthionocarbamates, mercaptobenzothiazoles, thiocarbamates and modified thiocarbamates, dithiophosphinates, trithiocarbonates, substituted mercaptobenzothiozoles, dithiophosphates, primary, secondary, and tertiary amines, primary, secondary, tertiary, and quaternary ammonium compounds, fatty amines, and ether amines. In some such embodiments, the collector and the functional group A are selective towards one or more components in the ore. In some such embodiments, the collector and the functional group A are selective towards silica and/or silicates. In some embodiments, the collector and functional group A are selective towards sulfide minerals.

In any of the first, second, third, fourth, fifth, sixth, seventh, eighth, ninth, tenth, or eleventh embodiments, in embodiments the number average molecular weight of at least one of the one or more functionalized silicones is between about 100 and about 10,000, in embodiments between about 100 and about 7,500, in embodiments, between about 200 and about 4,000, in embodiments between about 300 and 4,000, in embodiments between about 350 and about 1000, in embodiments, between about 350 and about 500.

In any of the first, second, third, fourth, fifth, sixth, seventh, eighth, ninth, tenth, or eleventh embodiments, in embodiments the ore is a particulate material having an average particle size of 1 to 1000 microns as measured by laser diffraction. In any of the first, second, third, fourth, fifth, sixth, seventh, eighth, ninth, tenth, or eleventh embodiments, in embodiments the ore is a particulate material having an average particle size as measured by laser diffraction of from about 1 μm to about 500 μm, in embodiments of about 5 μm to about 500 μm, in embodiments of about 10 μm to about 500 μm, in embodiments of about 10 μm to about 200 μm, or in embodiments of about 50 μm to about 150 μm. Herein "the particulate material have an average particle size" refers to the average particle size of the particulate material as obtained by comminution of the ore from which the particulate material was obtained; that is to say, for example, it does not refer to the particle size of the particulate material after combination with a collector and/or one or more functionalized silicones.

In any of the first, second, third, fourth, fifth, sixth, seventh, eighth, ninth, tenth, or eleventh embodiments, in embodiments the ore is a particulate material and the $D_{0.5}$ of the particles of the particulate material as measured by a Horiba LA-300 Laser Diffraction Particle Size Distribution Analyzer is from about 1 μm to about 50 μm. The $D_{0.5}$ is the average diameter below which 50% by weight of the particles are found. In some such embodiments, $D_{0.5}$ of the particles of the particulate material as measured, for example, by a Horiba LA-300 Laser Diffraction Particle Size Distribution Analyzer is from about 1 μm to about 20 μm, in embodiments about 1 μm to about 10 μm, in embodiments about 10 μm to about 20 μm, in embodiments 5 μm to 15 μm. In this context "$D_{0.5}$ of the particles of the particulate material" refers to the particulate material as obtained by comminution of the ore from which the particulate material were obtained; that is to say, for example, it does not refer to the particulate material after combination with a collector and/or one or more functionalized silicones.

In any of the first, second, third, fourth, fifth, sixth, seventh, eighth, ninth, tenth, or eleventh embodiments, in embodiments the concentration of the functionalized silicone in the sparge composition is from 1 to 10000 grams per ton of the sparge composition, in embodiments, 1 to 1000 grams per ton, in embodiments 1 to 100 grams per ton, or in embodiments 20 to 70 grams per ton.

In any of the first, second, third, fourth, fifth, sixth, seventh, eighth, ninth, tenth, or eleventh embodiments, in embodiments the concentration of the ore in the sparge composition is from 0.1% to 90%, in embodiments 20% to 40%, in embodiments 10% to 50%, in embodiments 20% to 50%, in embodiments 30% to 50%, in embodiments 0.5% to 50%, in embodiments 50% to 70%, in embodiments 1% to 50%, or in embodiments about 40% by weight of the sparge composition.

In any of the first, second, third, fourth, fifth, sixth, seventh, eighth, ninth, tenth, or eleventh embodiments, the medium comprises, consists of, or consists essentially of water.

As noted herein, the functionalized silicone increases the particle size of targeted particles. Therefore in embodiments, the average particle size of the targeted particles dispersed in a sparge composition comprising a medium and the functionalized silicone of the first, second, third, fourth, fifth, sixth, seventh, eighth, ninth, tenth, or eleventh embodiments is, in embodiments, larger than the particle size of the (chemically same) targeted particles dispersed in the medium absent the functionalized silicone.

Therefore, in embodiments there is provided a method comprising: comminuting a raw ore to obtain a comminuted ore, wherein the comminuted ore comprises, consists of, or consists essentially of a particulate material; adding the comminuted ore to a medium to make a slurry; and adding to the slurry a functionalized silicone composition comprising the one or more functionalized silicones of any of the first, second, third, fourth, fifth, sixth, seventh, eighth, ninth, tenth, or eleventh embodiments to form a sparge composition, wherein the $D_{0.5}$ of the particulate material in the slurry as measured by a Horiba LA-300 Laser Diffraction Particle Size Distribution Analyzer is from about 3 microns to about 20 microns less than the $D_{0.5}$ of the particulate material in the sparge composition, in some such embodiments 4 microns to 15 microns less, in embodiments some such embodiments 4 microns to 10 microns less, in some such embodiments 4 microns to 7 microns less.

In embodiments, the sparge composition of any of the first, second, third, fourth, fifth, sixth, seventh, eighth, ninth, tenth, and eleventh embodiments comprises 0.01 ppm (parts per million) to 100 ppm by weight of the one or more functional silicones, in embodiments 0.01 ppm to 5 ppm, in embodiments 0.01 ppm to 1 ppm, in embodiments 0.02 ppm to 3 ppm, in embodiments 1 ppm to 100 ppm, in embodiments 1 ppm to 5 ppm, in embodiments 1 ppm to 10 ppm, in embodiments 50 ppm to 100 ppm, in embodiments 1 ppm to 50 ppm, in embodiments 0.001 ppm to 1 ppm, or in embodiments 0.01 ppm to 0.1 ppm.

In embodiments, the sparge composition of the first, second, third, fourth, fifth, sixth, seventh, eighth, ninth, tenth, and eleventh embodiments comprises a medium, the medium comprising, consisting of, or consisting essentially of water; an ore, the ore comprising iron oxide and a gangue selected from silica, silicate, or a combination thereof, and one or more functionalized silicones defined above wherein-A is —NH$_2$; and a frother selected from isotridecyloxypropyl-1,3-diaminopropane, polypropylene glycol ether, isopropyl alcohol, oleyl diamine, methyl isobutyl carbinol, and any combination thereof.

In any of the methods disclosed herein, the sparge composition is suitably formed using methods familiar to one of skill in the art. In embodiments the sparge composition is formed by combining the components thereof in any order. In embodiments, forming the sparge composition of any of the embodiments disclosed herein comprises: combining a first portion of a medium, one or more functionalized silicones, and optionally one or more collectors and optionally one or more frothers to form a first composition; combining a second portion of the medium and an ore to form a second composition; and combining the first composition with the second composition to form the sparge composition.

The Ore

In any of the sparge compositions and methods described herein, the ore, in embodiments, comprises, consists of, or consists essentially of a particulate material. In embodiments, the particulate material comprises, consists essentially of, or consists of ultrafine particles. In embodiments, the average particle size of the particulate material in the sparge composition of any of the embodiments described herein is about 5 µm to about 100 µm, in embodiments about 5 µm to about 50 µm, in embodiments about 10 µm to about 50 µm, in embodiments about 15 µm to about 40 µm, in embodiments about 20 µm to about 35 µm.

The sparge compositions and methods including sparge compositions described herein comprising the functionalized silicones described herein are particularly effective for the beneficiation of poor ores, i.e. low-grade ores. Low grade ores generally require finer comminution than high-grade ores, thereby producing more ultrafine particles during comminution. What constitutes a low-grade ore varies according to the target element. For example, a low-grade iron ore, as used herein, comprises less than 40 percent by weight of iron; a low-grade nickel-containing sulfide ore, as used herein, comprises less than 0.1 weight percent nickel; a low-grade copper-containing sulfide ore, as used herein contains less than 0.5 percent by weight of copper; a low-grade lead-containing sulfide ore, as used herein, comprises less than 1 percent by weight of lead; a low-grade gold-containing sulfide ore, as used herein, contains less than 1.1 ppm gold. The aforementioned target elements, iron, nickel, copper, lead, and gold can be in the form of compounds thereof or elemental form. In any of the embodiments of the methods and compositions described herein, in embodiments the ore in the sparge composition can comprise a low grade ore. In some such embodiments, the low-grade ore is selected from a low-grade iron-ore, a low-grade nickel containing sulfide ore, a low-grade copper-containing sulfide ore, a low-grade lead-containing sulfide ore, a low-grade gold-containing ore, or any combination thereof.

In any of the embodiments described herein, the ore in the sparge composition comprises a metal in the form of one or more metal compounds and/or in the form of an element. For example, iron ores comprise iron compounds such as oxides, which contain iron in the form of ferrous and/or ferric ions.

In embodiments, the ore of any of the methods or compositions comprises 0.01 to 1% by weight of one or more metals (irrespective of whether they are in the form of a metal compound or elemental), in embodiments 0.1% to 1%, in embodiments 0.3% to 0.8%, in embodiments 0.01% to 5%, in embodiments 0.1% to 3%, in embodiments 0.5% to 3%, in embodiments 1% to 3%, in embodiments 1% to 2.5%, in embodiments 1% to 2% in embodiments 1.5% to 2.5%, in embodiments 0.1% to 10%, in embodiments 1% to 10%, in embodiments 3% to 10%, in embodiments 3% to 9%, in embodiments 4% to 8%, in embodiments 5% to 9%, in embodiments 5% to 8%, in embodiments 6% to 8%, or in embodiments 7% to 8% of one or more metals.

In any of the methods and compositions described herein wherein the ore comprises an iron compound, in embodiments the ore in the sparge composition comprises about 1% to about 70% by weight iron, in embodiments about 1% to about 60% by weight iron, in embodiments about 1% to about 50% by weight of iron, in embodiments about 1% to about 40% by weight of iron, in embodiments about 1% to about 30% by weight of iron, in embodiments about 10% to about 70%, in embodiments about 10% to about 60%, in embodiments about 10% to about 50%, in embodiments about 10% to about 40%, in embodiments about 10% to about 30%, in embodiments 15% to about 40%, in embodiments 15% to about 30%, in embodiments about 20% to about 40%, in embodiments about 20% to about 30%, in embodiments about 25% to about 50%, in embodiments about 25% to about 40%, in embodiments about 30% to about 50%, in embodiments about 30% to about 60%, in embodiments about 35% to about 50%, or in embodiments about 35% to about 60% by weight iron.

In embodiments, the ore of any of the sparge compositions described herein comprises 0.01 to 1% by weight of copper, in embodiments 0.1% to 1% by weight of copper, in embodiments 0.01% to 1% copper, in embodiments about 0.01% to 0.8%, in embodiments 0.01% to 0.7%, in embodiments 0.01% to 0.6%, in embodiments 0.01% to 0.5% by weight of copper, or in embodiments 0.3% to 0.8% by weight of copper; in embodiments 0.01% to 0.1% by weight of nickel, in embodiments 0.01% to 0.07%, in embodiments 0.01% to 0.06%, in embodiments 0.001% to 0.1%, in embodiments 0.5% to 1.5% nickel, in embodiments 0.01% to 5% by weight nickel, in embodiments 0.1% to 3% by weight of nickel, in embodiments 0.5% to 3% by weight nickel, in embodiments 1% to 3% by weight nickel, in embodiments 1% to 2.5% by weight nickel, in embodiments 1% to 2% by weight nickel, or in embodiments 1.5% to 2.5% by weight nickel; in embodiments 0.01% to 1% by weight lead, in embodiments 0.1% to 1% by weight of lead, in embodiments 0.1% to 0.9% by weight of lead, in embodiments 0.1% to 10% by weight of lead, in embodiments 1% to 10% by weight lead, in embodiments 3% to 10% by weight lead, in embodiments 3% to 9%, in embodiments 4% to 8%, in embodiments 5% to 9%, in embodiments 5% to 8%, in embodiments 6% to 8%, or in embodiments 7% to 8% of lead by weight; or any combination thereof. In some such embodiments, the ore is a sulfide ore comprising one or more metal sulfides.

In any of the methods and compositions described herein wherein the ore comprises an iron compound, in embodiments the ore in the sparge composition comprises about 1% to about 70% by weight iron, in embodiments about 1% to about 50% by weight iron, in embodiments about 1% to about 40% by weight of iron, in embodiments about 1% to about 30% by weight of iron, in embodiments about 1% to about 35% by weight of iron, in embodiments about 1% to about 60% by weight iron, in embodiments about 10% to about 70%, in embodiments about 10% to about 60%, in embodiments about 10% to about 50% by weight of iron, in embodiments about 10% to about 40% by weight of iron, in embodiments about 10% to about 30% by weight of iron, in embodiments 15% to about 70%, in embodiments 15% to about 60%, in embodiments about 20% to about 70%, in embodiments about 20% to about 60%, in embodiments about 25% to about 70%, in embodiments about 25% to about 60%, in embodiments about 30% to about 70%, in embodiments about 30% to about 60%, in embodiments about 35% to about 70%, or in embodiments about 35% to about 60% by weight iron.

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

Examples

Example 1: Collector-Frother Mixes

Seven formulae of two or more of frother, collector, and functionalized silicone were made up as shown in Table 1.

TABLE 1

Frother, collector, functionalized silicone formulae

| Formula | Percent by weight | | | |
|---|---|---|---|---|
| | Silicone amine Si4T | Iso C13 ether diamine | Frother | |
| A | 5% | 95% | 0% | None |
| B | 0% | 95% | 5% | PPG |
| C | 0% | 95% | 5% | IPA |
| D | 5% | 90% | 5% | PPG |
| E | 5% | 90% | 5% | IPA |
| F | 2.5% | 85% | 7.5% 5% | DO PPG |
| G | 2.5% | 85% | 7.5% 5% | DO IPA |

Silicone amine 4T (Si4T) - silicone having structure (V), wherein n = 0 to 2, j = 2 to 4
Iso C13 ether diamine = isotridecyloxypropyl-1,3-diaminopropane
PPG = polypropylene glycol ether
IPA = isopropyl alcohol
DO = oleyl diamine Example 2

The effect of various collector and/or functionalized silicone formulations on the agglomeration of silica in a silica slurry was assessed by particle size measurement. About 0.2 g silica powder (98.5% $SiO_2$, 98%-200 mesh) was dispersed into 250 ml of deionized water (DI water) in a sample vessel to make an untreated silica slurry. One part by weight of each of iso C13 ether diamine, silicone amine Si4T, and formula D was made up to 100 parts by weight in deionized water to give three 1% mixtures. One part by weight of each of the three 1% mixtures was added to 99 parts by weight of the untreated silica slurry to give three treated silica slurry samples. The pH of each of the three treated silica slurry samples was adjusted as necessary to 7.8, as was that of a sample of untreated slurry. After pH adjustment, the four samples were conditioned for two minutes. The particle size distribution of each of the four conditioned slurries was measured using a HORIBA LA-300 Laser Diffraction Particle Size Distribution Analyzer. The results are displayed in Table 2.

TABLE 2

Particle size measurements

| Slurry | Particle size*, μm | | |
|---|---|---|---|
| | $D_{0.1}$ | $D_{0.5}$ | $D_{0.9}$ |
| Untreated (silica in DI water) | 0.5 | 14 | 26 |
| Treated with 100 ppm by weight iso C13 ether diamine (silica in DI water) | 0.5 | 15 | 29 |
| 100 ppm silicone amine Si4T in DI water | 0.9 | 35 | 66 |
| 100 ppm Formula D | 0.7 | 20 | 50 |

*$D_{0.1}$, $D_{0.5}$ and $D_{0.9}$ are the 10, 50, and 90 volume percent respectively of the sample of silica particles that were below these diameters.

As shown in the Table 2, iso C13 ether diamine has minimal impact on the particle size of silica. However, the silicone amine Si4T markedly increases particle size of the silica, as does Formula D, a blend of Si4T and iso C13 diamine.

Examples 3-5: Froth Flotation Separation Tests

Reverse flotation tests were performed in a Denver D-12 Laboratory Flotation Machine for iron ore flotation. Each of the collectors, and collectors containing functionalized silicone was prepared as a 1% solution in DI water. Methyl isobutyl carbinol (MIBC) as a 0.2% solution in DI water was used as frother. Two magnetite iron ore samples from iron ore plants were used for the flotation tests: Iron Ore A (particle size, 85% by weight under 44 μm; 66.8% Fe and 5.8% $SiO_2$); and Iron Ore B (particle size, 82% by weight under 44 μm; 67% Fe and 5.1% $SiO_2$).

The iron ore slurry was made by dispersing comminuted iron ore at 40% solids in water. For each test, 1.2 liters of iron ore slurry was conditioned with addition of the collector and the frother (amounts of each given below). The slurry was then sparged with air in a two-step process. The silica/silicate was floated from the slurry as tailings and the concentrated iron ore remained in the slurry as concentrate. Both concentrate and tailings were filtered, dried, weighed, and analyzed for iron and silica content.

Example 3

The froth flotation separation test was performed on three slurries, each containing a sample of Iron Ore A, one at a low (Experiment 1) and one at a higher dosage of iso C13 ether diamine (Experiment 2), and one slurry containing a higher dose of Formula A (Experiment 3), as shown in TABLE 3, wherein all dosages are in units of grams per ton. The slurries thus made also contained 8.5 ppm by weight of MIBC added as a 0.2% solution in DI water. The results are given in TABLE 3. For the three experiments, iron (in the form of various compounds) recovery was plotted against silica removal. The plot is shown in FIG. 1. The higher the iron recovery and the higher the silica removal (i.e. purity of the recovered iron from silica), the more desirably effective the froth separation. As seen from the results displayed in TABLE 3 and FIG. 1, the higher the amount of collector, the lower the iron recovery but the better the silica removal (i.e. the purity of the iron recovered from silica). However, FIG. 1 shows that Formula A gives better iron recovery at the same silica removal or better silica removal at the same iron recovery than iso C13 ether diamine.

TABLE 3

Froth flotation results, Experiments 1-3

| Experiment No. | Collector Formula | Dose, g/t | Grade, % Fe | Grade, % SiO$_2$ | Fe recovery, % | SiO$_2$ removal, % |
|---|---|---|---|---|---|---|
| 1 | Iso C13 ether diamine | 30 | 67.48 | 4.88 | 94.23 | 18.62 |
| 2 | Iso C13 ether diamine | 44 | 67.83 | 4.50 | 89.47 | 29.07 |
| 3 | Formula A | 44 | 67.62 | 4.42 | 89.25 | 31.73 |

Example 4

Figure 2:
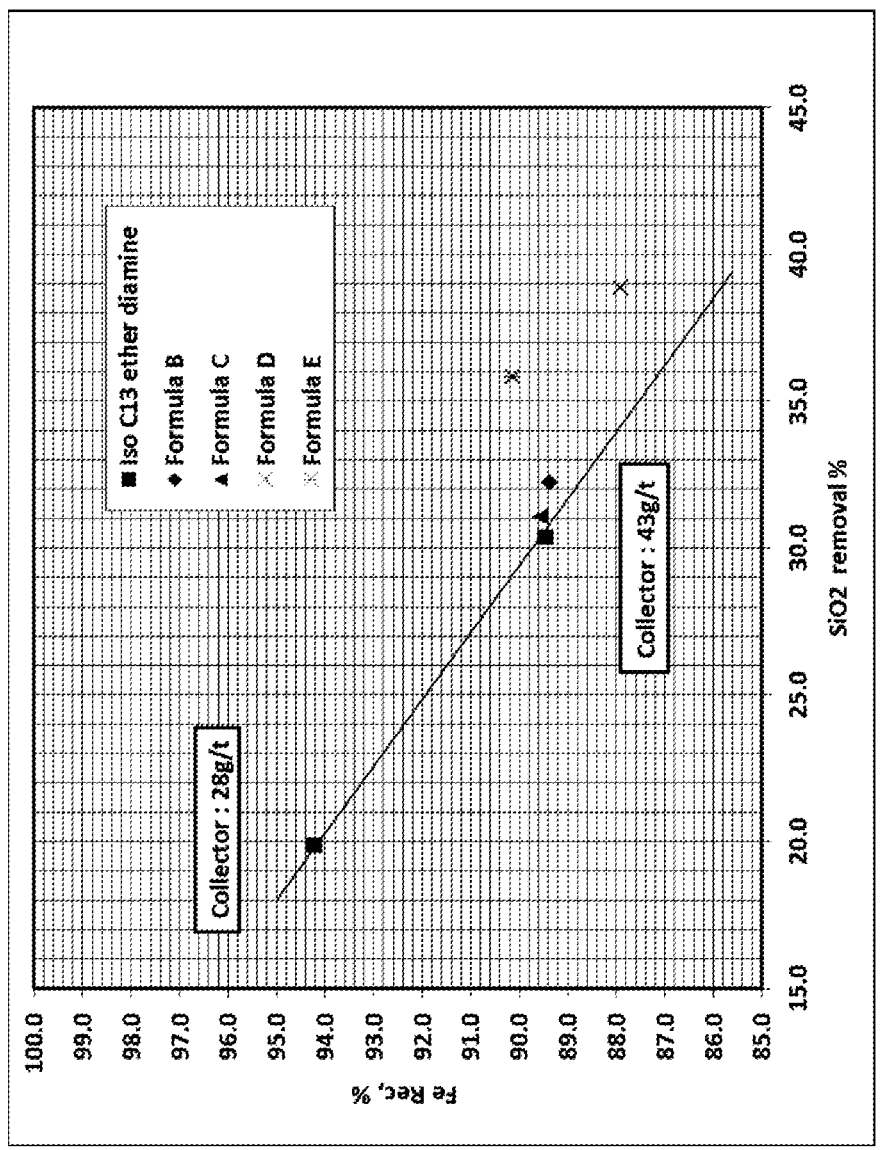
FIG. 2 shows a plot of the percentage of iron recovered versus the percentage of silica removed in the concentrate for the collector iso C13 ether diamine, Formula B, Formula C, Formula D, and Formula E of the Examples.

The froth flotation separation test was performed on six slurries, each of a sample of Iron Ore A, one slurry containing a low (Experiment 4) and one slurry containing a higher dosage of iso C13 ether diamine (Experiment 5), one slurry containing a higher dosage of Formula B (Experiment 6), one with Formula C (Experiment 7), one with Formula D (Experiment 8), and one with Formula E (Experiment 9)-all dosages given in TABLE 4 in grams per ton. Each of the six slurries thus made also contained 8.5 ppm by weight of MIBC added as a 0.2% solution in DI water. The results are given in TABLE 4. For the six experiments, recovery of iron (in the form of various compounds) was plotted against silica removal. The plot is shown in FIG. 2. As seen from the results displayed in TABLE 4 and FIG. 2, the higher the amount of collector, the lower the iron recovery but the better the silica removal, as noted in Example 3. Formulae B and C contained no Si4T, formulae D and E contained Si4T. Formulae B and D had PPG frother, formulae C and E had IPA frother. Formulae D and E, both containing Si4T, produced markedly higher silica removal than formulae B and C without Si4T or iso C13 ether diamine (without Si4T).

FIG. 2 clearly shows that Formulae D and E gave markedly better iron recovery at the same silica removal or markedly better silica removal at the same iron recovery than iso C13 ether diamine or Formulae C and D. Addition of PPG (Formula B) or IPA (formula C) frothers to the iso C13 ether diamine collector gave only a very slight improvement in froth flotation performance of the collector, but addition of the Si4T to the iso C13 ether diamine either increased iron recovery 2-3% or increase silica removal 5-6%. The improved combination of iron recovery and silica removal can clearly be seen in FIG. 2.

TABLE 4

Froth flotation results, Experiments 4-9

| Experiment No. | Collector Formula | Dose, g/t | Grade, % Fe | Grade, % SiO$_2$ | Fe recovery, % | SiO$_2$ removal, % |
|---|---|---|---|---|---|---|
| 4 | Iso C13 ether diamine | 28 | 67.48 | 4.78 | 94.23 | 19.88 |
| 5 | Iso C13 ether diamine | 43 | 67.83 | 4.40 | 89.47 | 30.37 |
| 6 | Formula B | 43 | 67.83 | 4.35 | 89.39 | 32.27 |
| 7 | Formula C | 43 | 67.83 | 4.36 | 89.56 | 31.07 |
| 8 | Formula D | 43 | 68.56 | 4.01 | 87.91 | 38.89 |
| 9 | Formula E | 43 | 68.24 | 4.10 | 90.13 | 35.85 |

Example 5

Figure 3:
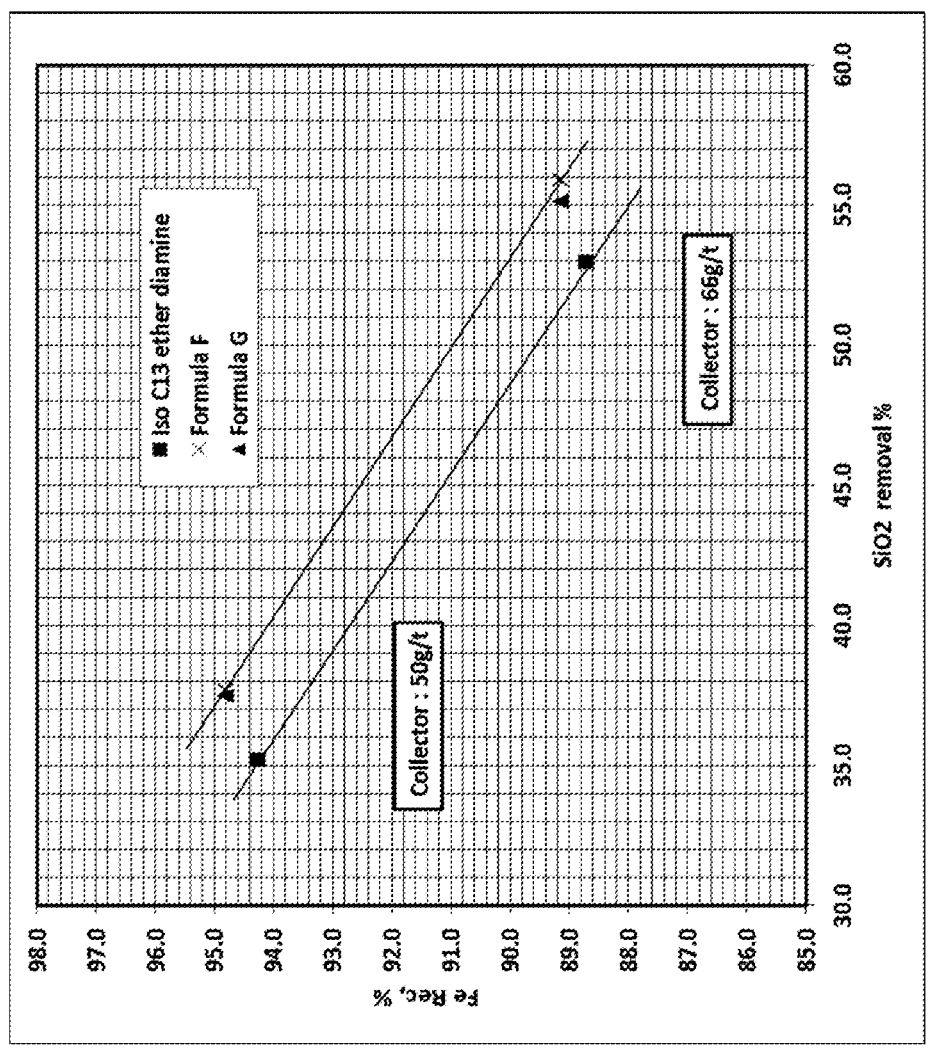
FIG. 3 shows a plot of the percentage of iron recovered versus the percentage of silica removed in the concentrate for the collector iso C13 ether diamine, Formula F, and Formula G of the Examples.

The froth flotation separation test was performed on six slurries, each made with a sample of Iron Ore B, one slurry having a lower (Experiment 10) and one having a higher dosage of iso C13 ether diamine (Experiment 11) added, one with the lower and one with the higher dosage of Formula F (Experiments 12 and 13 respectively), and one with the lower and one with the higher dosage of Formula F (Experiments 14 and 15 respectively) added, as shown in TABLE 5. Each slurry also contained 15 ppm by weight of MIBC added as a 0.2% solution in DI water. The results are given in TABLE 5, wherein all dosages are in grams per ton. For the six experiments, recovery of iron (in the form of various compounds) was plotted against silica removal. The plot is shown in FIG. 3. As seen in FIG. 3, Formulae F and G furnished better iron recovery at given silica purity or better silica purity at given iron recovery than iso C13 ether diamine.

TABLE 5

Froth flotation results, Experiments 10-15

| Experiment No. | Collector Formula | Dose, g/t | Grade, % Fe | Grade, % SiO$_2$ | Fe recovery, % | SiO$_2$ removal, % |
|---|---|---|---|---|---|---|
| 10 | Iso C13 ether diamine | 50 | 68.26 | 3.76 | 94.26 | 35.20 |
| 11 | Iso C13 ether diamine | 66 | 69.00 | 2.93 | 88.72 | 52.98 |
| 12 | Formula F | 50 | 69.32 | 2.69 | 89.16 | 55.94 |
| 13 | Formula F | 66 | 68.58 | 3.54 | 94.81 | 37.70 |
| 14 | Formula G | 50 | 68.43 | 3.56 | 95.24 | 37.49 |
| 15 | Formula G | 66 | 69.16 | 2.74 | 89.65 | 55.14 |

All these results demonstrated that all the slurries that contained the amine-functionalized silicone outperform those without the amine-functionalized silicone but having an amine collector in iron recovery, silicate removal, or both.

What is claimed is:

1. A sparge composition comprising:
   (i) a medium comprising water;
   (ii) an ore comprising a beneficiary and a gangue, the gangue comprising a silica, a silicate, or a combination thereof; and
   (iii) one or more functionalized silicones having the formula (I)

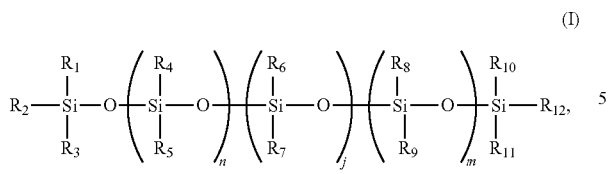

wherein each of $R_1$, $R_2$, $R_3$, $R_4$, $R_5$, $R_6$ $R_7$, $R_8$, $R_9$, $R_{10}$, $R_{11}$, and $R_{12}$ is individually selected from linear alkyl, branched alkyl, alicyclic alkyl, aryl, alkaryl, alkoxy, hydroxyalkyl, hydroxyalkoxy, alkoxyalkyl, alkyl ether, hydroxylated polyol, and $-(CH_2)_b$-A wherein b is an integer from 0-20, with the proviso that at least one of $R_1$, $R_2$, $R_3$, $R_4$, $R_5$, $R_6 R_7$, $R_8$, $R_9$, $R_{10}$, $R_{11}$, and $R_{12}$ is $-(CH_2)_b$-A, wherein n is from 0 to 700, j is from 0 to 700, and m is from 0 to 700, with the proviso that the sum [n+j+m] is 1-2100, and wherein A is a moiety selected from amino, mercapto, amines, ammonium groups, thiols, carboxylates, sulfates, sulfonates, hydroxamates, sulfosuccinates, sulfosuccinamates, phosphonic esters, phosphoric esters, xanthates, xanthogen formates, dithiophosphinates, trithiocarbonates, dithiophosphates, thiazoles, sulfides, disulfides, and oximes.

2. The sparge composition of claim 1, wherein b>0.

3. The sparge composition of claim 1, wherein b=3.

4. A sparge composition comprising:
(i) a medium comprising water;
(ii) an ore comprising a beneficiary and a gangue; and
(iii) one or more functionalized silicones having the formula (I)

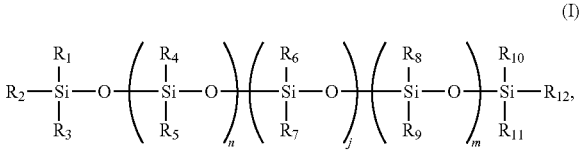

wherein each of $R_1$, $R_2$, $R_3$, $R_4$, $R_5$, $R_6$, $R_7$, $R_8$, $R_9$, $R_{10}$, $R_{11}$ and, $R_{12}$ is individually selected from linear alkyl, branched alkyl, alicyclic alkyl, aryl, alkaryl, alkoxy, hydroxyalkyl, hydroxyalkoxy, alkoxyalkyl, alkyl ether, hydroxylated polyol, and $-(CH_2)_b$-A wherein b is an integer from 0-20, with the proviso that at least one of $R_1$, $R_2$, $R_3$, $R_4$, $R_5$, $R_6$, $R_7$, $R_8$, $R_9$, $R_{10}$, $R_{11}$, and $R_{12}$ is $-(CH_2)_b$-A, wherein n is from 0 to 700, j is from 0 to 700, and m is from 0 to 700, with the proviso that the sum [n+j+m] is 1-2100, wherein A is a moiety selected from amino, amines, and ammonium groups, the beneficiary comprises an iron oxide, and the gangue comprises a silica, a silicate, or a combination thereof.

5. The sparge composition of claim 4, the sparge composition further comprising a collector selected from fatty amine compounds, ether amines, and mixtures thereof.

6. The sparge composition of claim 4, the sparge composition further comprising isotridecyloxypropyl-1,3-diaminopropane.

7. The sparge composition of claim 6, the sparge composition further comprising a frother selected from propylene glycol ether, isopropyl alcohol, oleyl diamine, and methyl isobutyl carbinol.

8. The sparge composition of claim 1, wherein the beneficiary comprises a sulfide and A is a moiety selected from mercapto, thiols, xanthates, dithiophosphinates, trithiocarbonates, dithiophosphates, thiazoles, sulfides, and disulfides.

9. The sparge composition of claim 8, further comprising a collector selected from xanthates, xanthogen formates, thionocarbamates, dithiophosphates, sodium salts of dithiophosphates, zinc salts of dithiophosphates, thiols, mercaptobenzothiazoles, ethyl octyl sulfide, or a combination thereof.

10. The sparge composition of claim 1, wherein the number average molecular weight of each of the one or more functionalized silicones is between 200 and 10,000.

11. The sparge composition of claim 1, wherein the one or more functionalized silicones is selected from

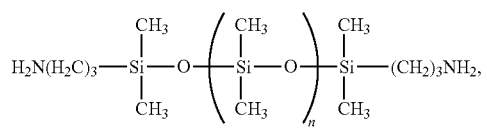

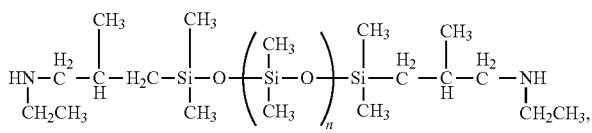

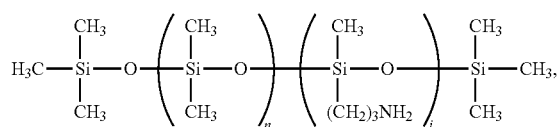

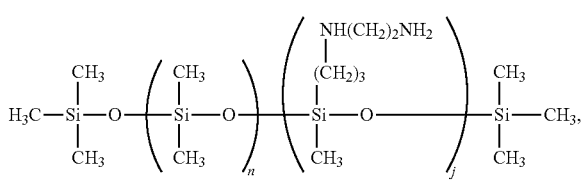

(VI)
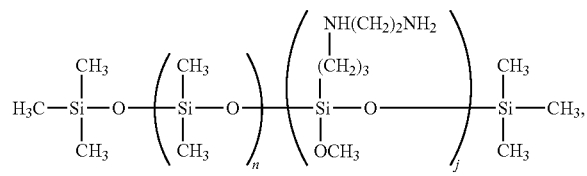
(VII)
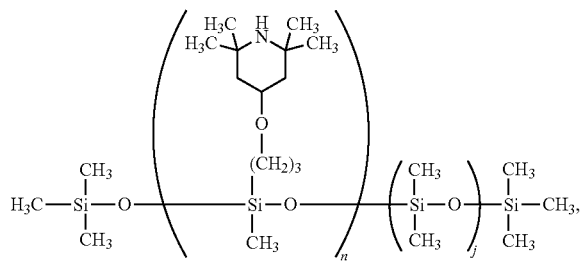
(VIII)
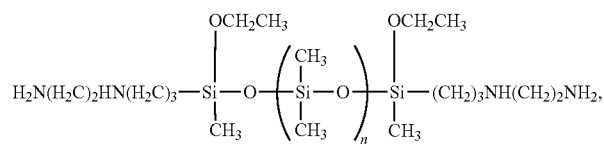
(IX)
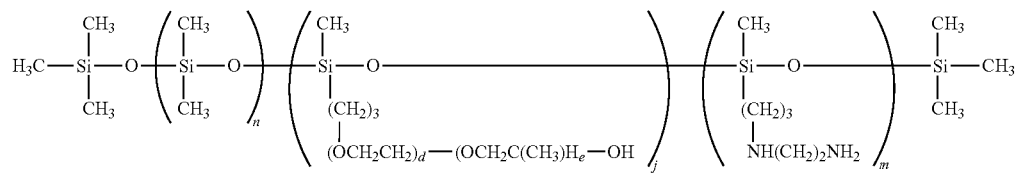
wherein d is 1-20 and e is 1-20,
(X)
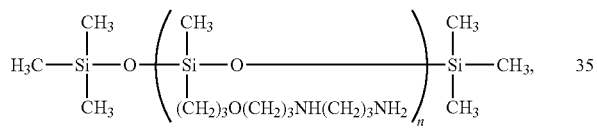
(XI)
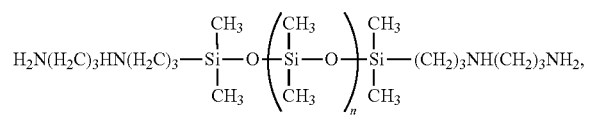
and any combination thereof.
12. The sparge composition of claim 1, wherein the one or more functionalized silicones comprises
(V)
wherein n is 0 to 2, and j is 2 to 4.
13. The sparge composition of claim 12, wherein the beneficiary comprises an iron oxide.
* * * * *

UNITED STATES PATENT AND TRADEMARK OFFICE
CERTIFICATE OF CORRECTION

PATENT NO. : 11,014,097 B2
APPLICATION NO. : 15/840928
DATED : May 25, 2021
INVENTOR(S) : Jianjun Liu et al.

It is certified that error appears in the above-identified patent and that said Letters Patent is hereby corrected as shown below:

In the Claims

Column 29, Claim 1, Line 10, delete "R6R7," and insert --R6, R7--

Column 29, Claim 1, Line 16, delete "R6R7," and insert --R6, R7--

Column 30, Claim 4, Line 2, insert a --,-- after "R11"

Column 30, Claim 4, Line 2, delete "," after "and"

Signed and Sealed this
Fourteenth Day of June, 2022

Katherine Kelly Vidal
*Director of the United States Patent and Trademark Office*